United States Patent
Perry

(10) Patent No.: US 10,229,541 B2
(45) Date of Patent: Mar. 12, 2019

(54) METHODS AND SYSTEMS FOR NAVIGATION WITHIN VIRTUAL REALITY SPACE USING HEAD MOUNTED DISPLAY

(71) Applicant: Sony Interactive Entertainment America LLC, San Mateo, CA (US)

(72) Inventor: David Perry, Monarch Beach, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 0 days.

(21) Appl. No.: 15/009,796

(22) Filed: Jan. 28, 2016

(65) Prior Publication Data

US 2017/0221264 A1     Aug. 3, 2017

(51) Int. Cl.
  *G06F 3/01* (2006.01)
  *G02B 27/01* (2006.01)
  *G06T 19/00* (2011.01)
  *H04N 13/344* (2018.01)

(52) U.S. Cl.
  CPC .......... *G06T 19/006* (2013.01); *G02B 27/017* (2013.01); *G02B 27/0179* (2013.01); *G06F 3/011* (2013.01); *G06F 3/012* (2013.01); *G06F 3/013* (2013.01); *H04N 13/344* (2018.05); *G02B 2027/0187* (2013.01)

(58) Field of Classification Search
  CPC .. G06T 19/006; H04N 13/044; H04N 13/344; G02B 27/017; G02B 27/0179; G02B 2027/0187
  USPC .......................................................... 345/633
  See application file for complete search history.

(56) References Cited

U.S. PATENT DOCUMENTS

| | | | |
|---|---|---|---|
| 8,223,024 B1* | 7/2012 | Petrou .................. | G02B 27/017 340/539.13 |
| 2012/0194550 A1* | 8/2012 | Osterhout .......... | G02B 27/0093 345/633 |
| 2014/0078175 A1 | 3/2014 | Forutanpour et al. | |
| 2014/0267400 A1* | 9/2014 | Mabbutt ............... | G06T 19/006 345/633 |

(Continued)

FOREIGN PATENT DOCUMENTS

WO      2015108887 A1    7/2015

OTHER PUBLICATIONS

International Search Report PCT/ISA/210 and Written Opinion PCT/ISA/237—14 pages dated Mar. 22, 2017.

*Primary Examiner* — Ke Xiao
*Assistant Examiner* — Kim Thanh T Tran
(74) *Attorney, Agent, or Firm* — Penilla IP, APC

(57) ABSTRACT

Video data is transmitted to a head mounted display for display of a virtual reality scene within the head mounted display. The virtual reality scene includes multiple objects representing display screens of computing sources or information sources. Upon detecting movement of the head mounted display, an adjustment of the virtual reality scene is generated in which a field of view of the user is moved within the virtual reality scene, and a focus direction of the user is determined. Based on the focus direction of the user, an object of current focus of the user within the virtual reality scene is determined. The virtual reality scene is adjusted to move the object of current focus of the user toward a point of view of the user within the virtual reality scene. Audio content associated with the object of current focus of the user is provided to the head mounted display.

25 Claims, 31 Drawing Sheets

(56) References Cited

U.S. PATENT DOCUMENTS

| | | | |
|---|---|---|---|
| 2014/0361984 A1* | 12/2014 | Kim | G06F 3/013 |
| | | | 345/156 |
| 2014/0368535 A1 | 12/2014 | Salter et al. | |
| 2014/0372957 A1 | 12/2014 | Keane et al. | |
| 2015/0049002 A1 | 2/2015 | Ishikawa et al. | |
| 2015/0094142 A1* | 4/2015 | Stafford | A63F 13/212 |
| | | | 463/31 |
| 2015/0153571 A1* | 6/2015 | Ballard | H04W 76/10 |
| | | | 345/8 |
| 2016/0011724 A1 | 1/2016 | Wheeler et al. | |
| 2016/0140766 A1* | 5/2016 | Balachandreswaran | |
| | | | G06T 19/006 |
| | | | 345/633 |

* cited by examiner

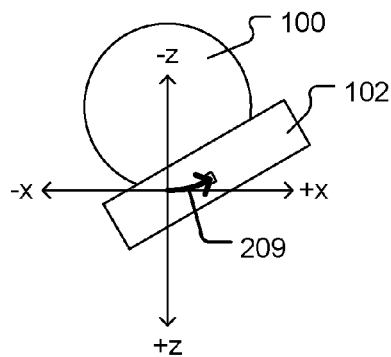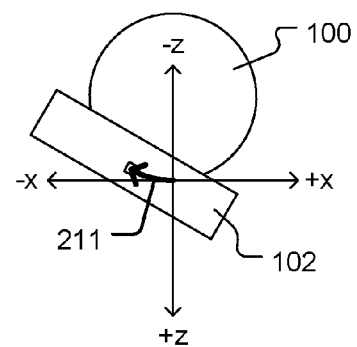
Fig. 3A  Fig. 3B
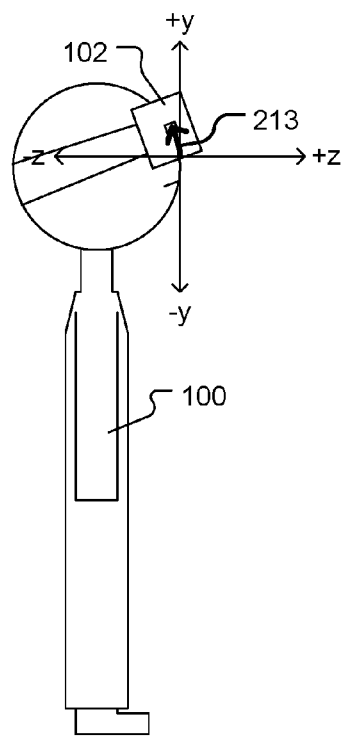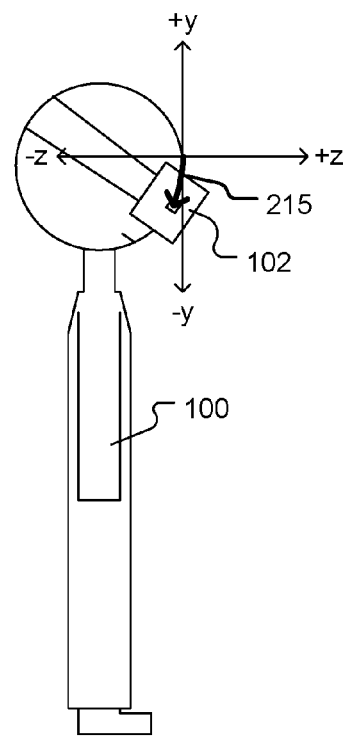
Fig. 3C  Fig. 3D

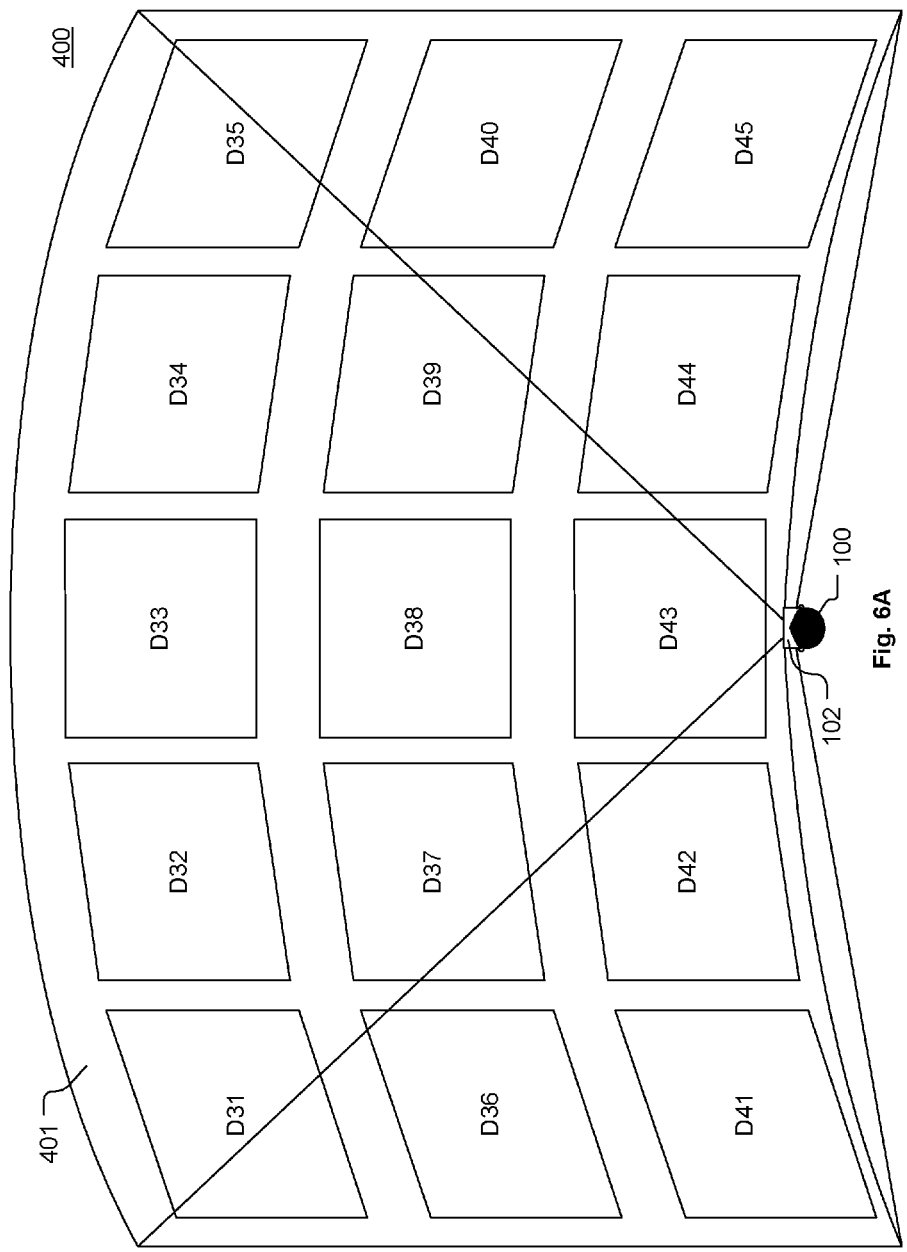

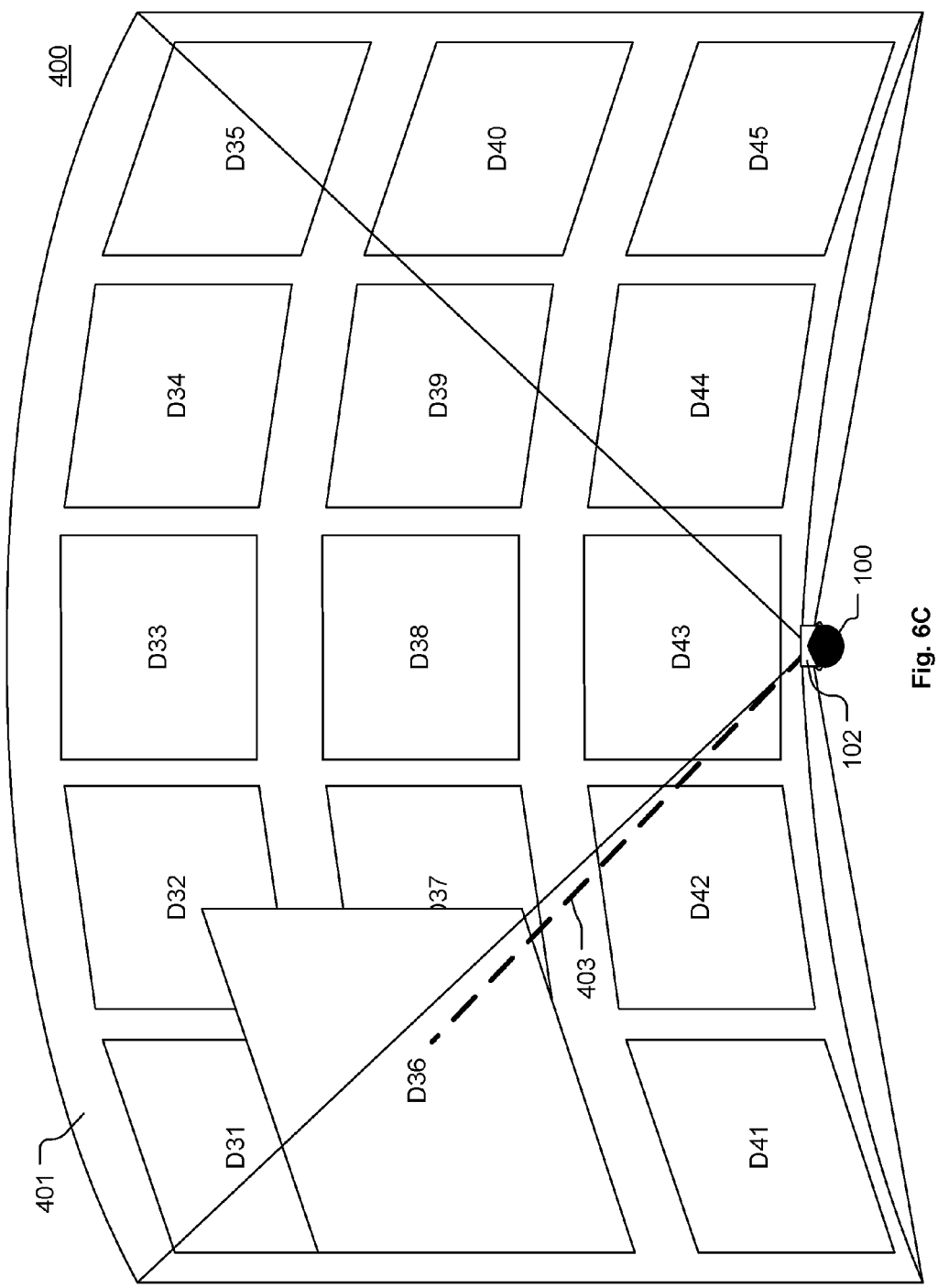

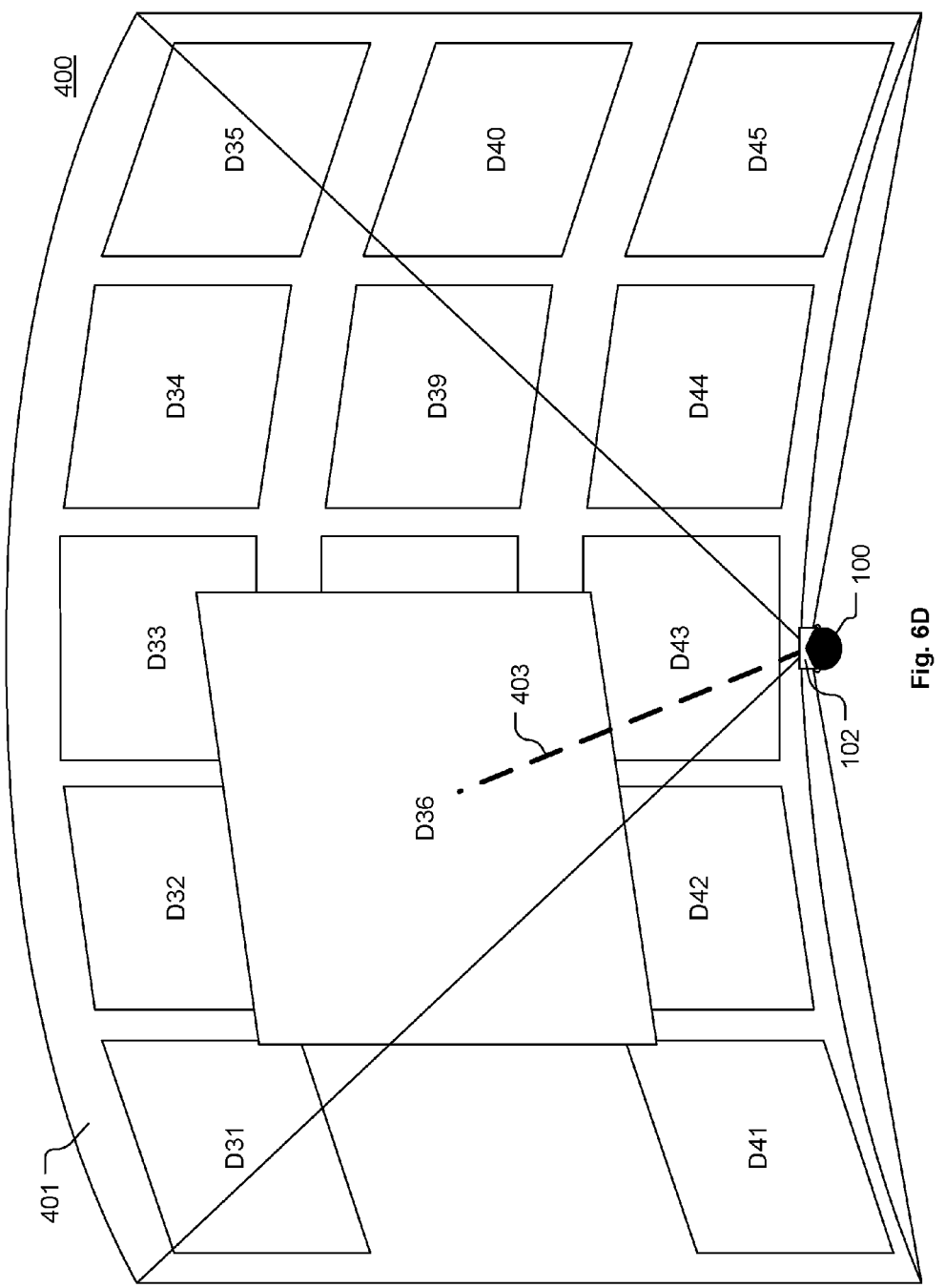

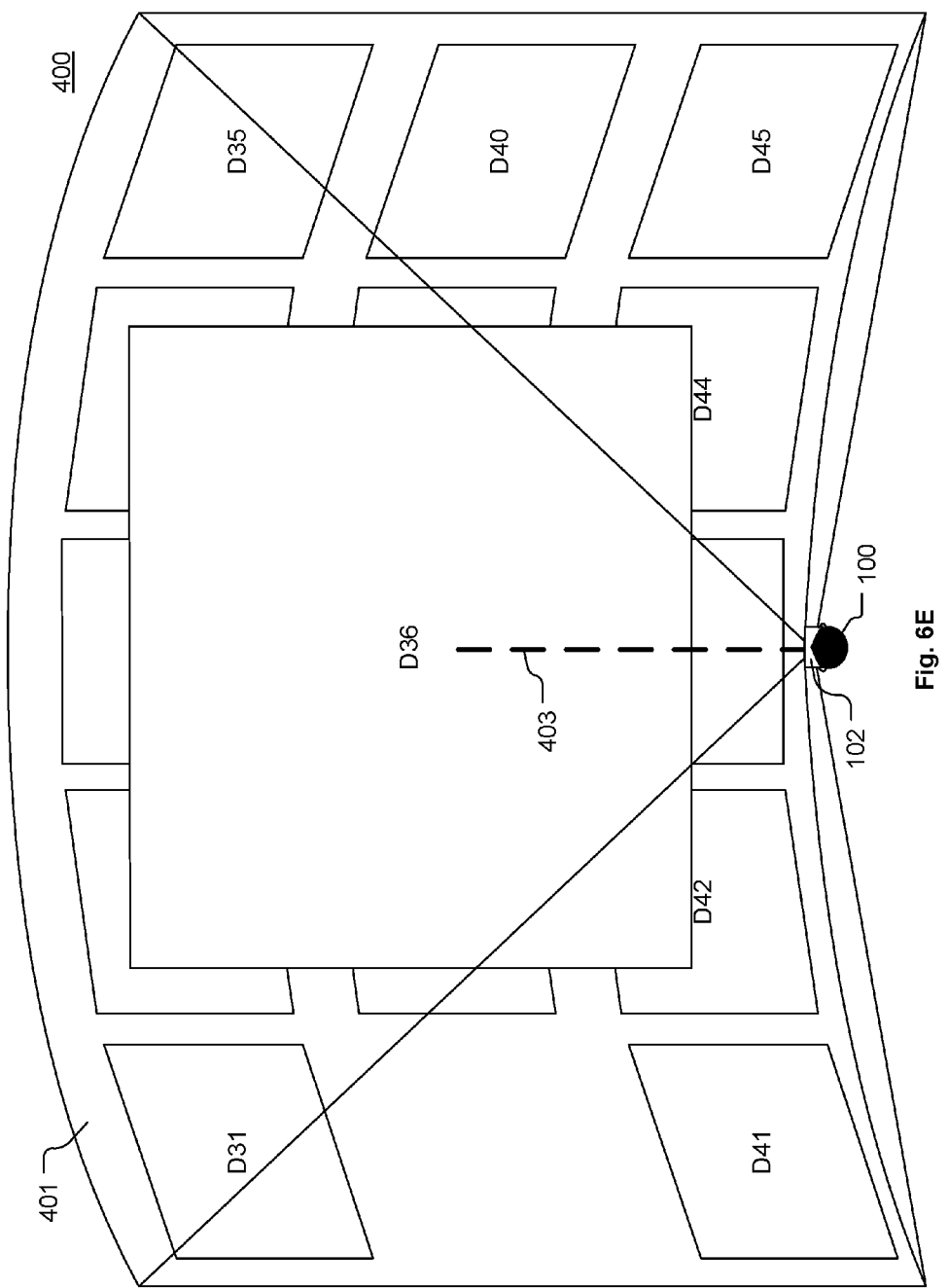

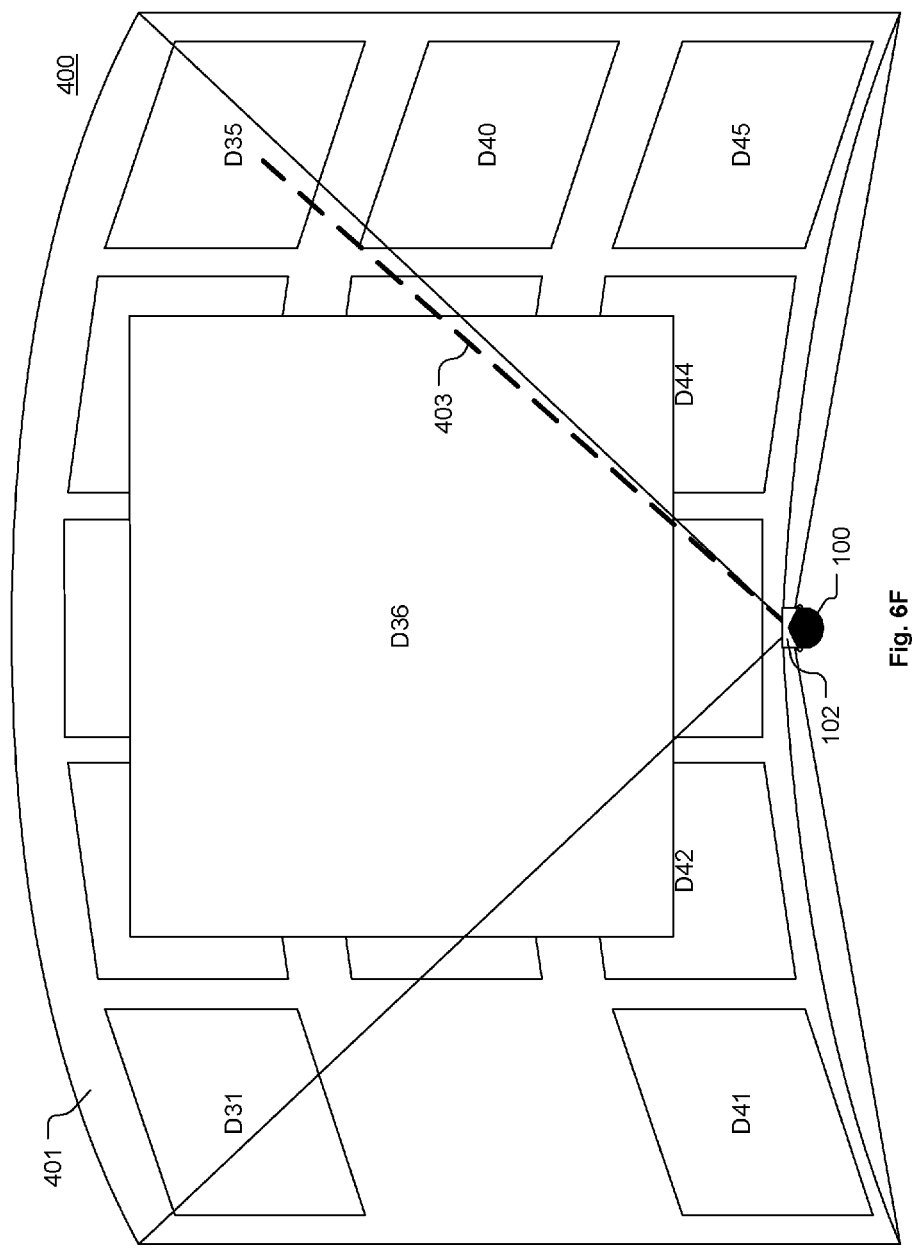

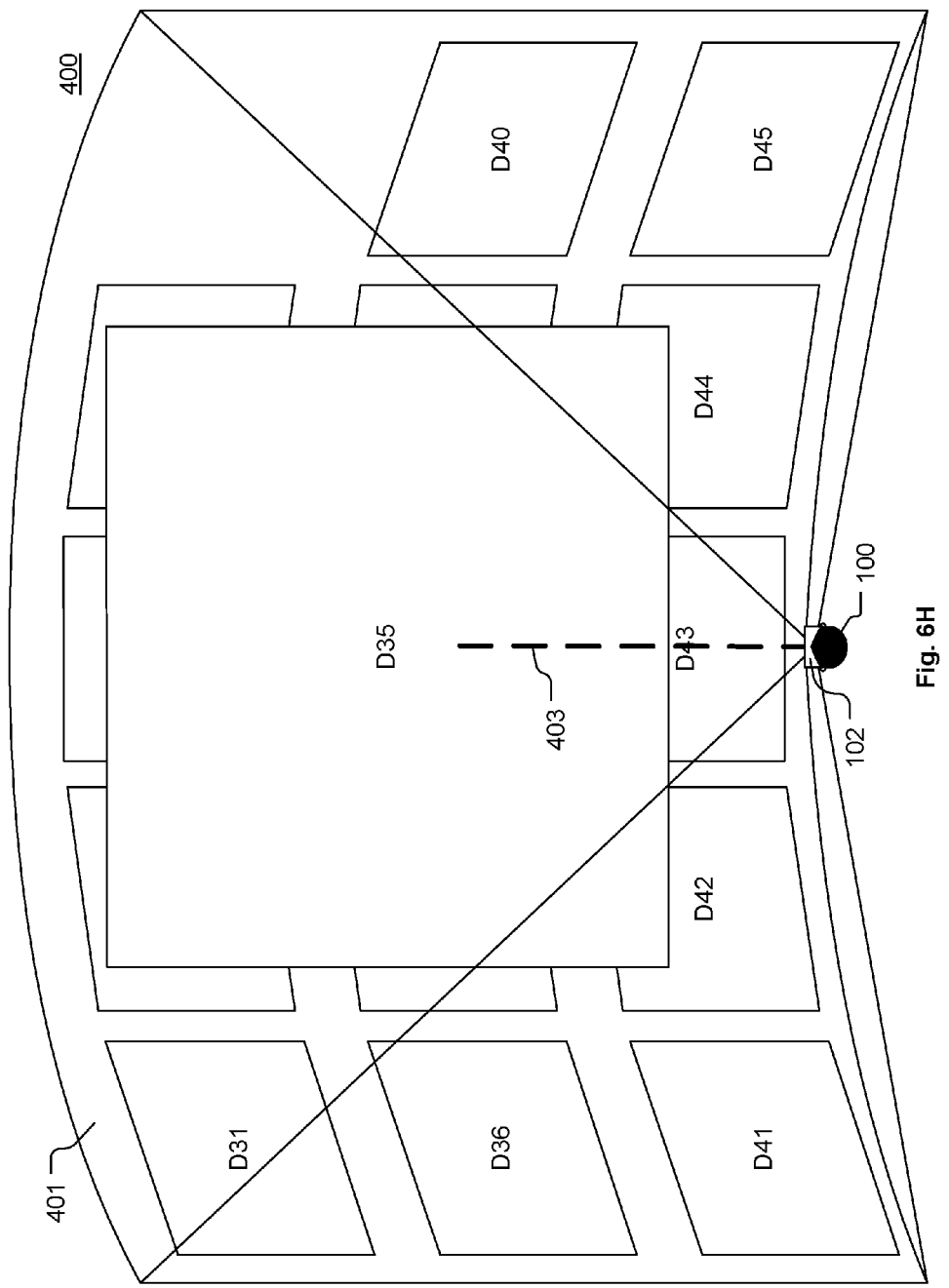

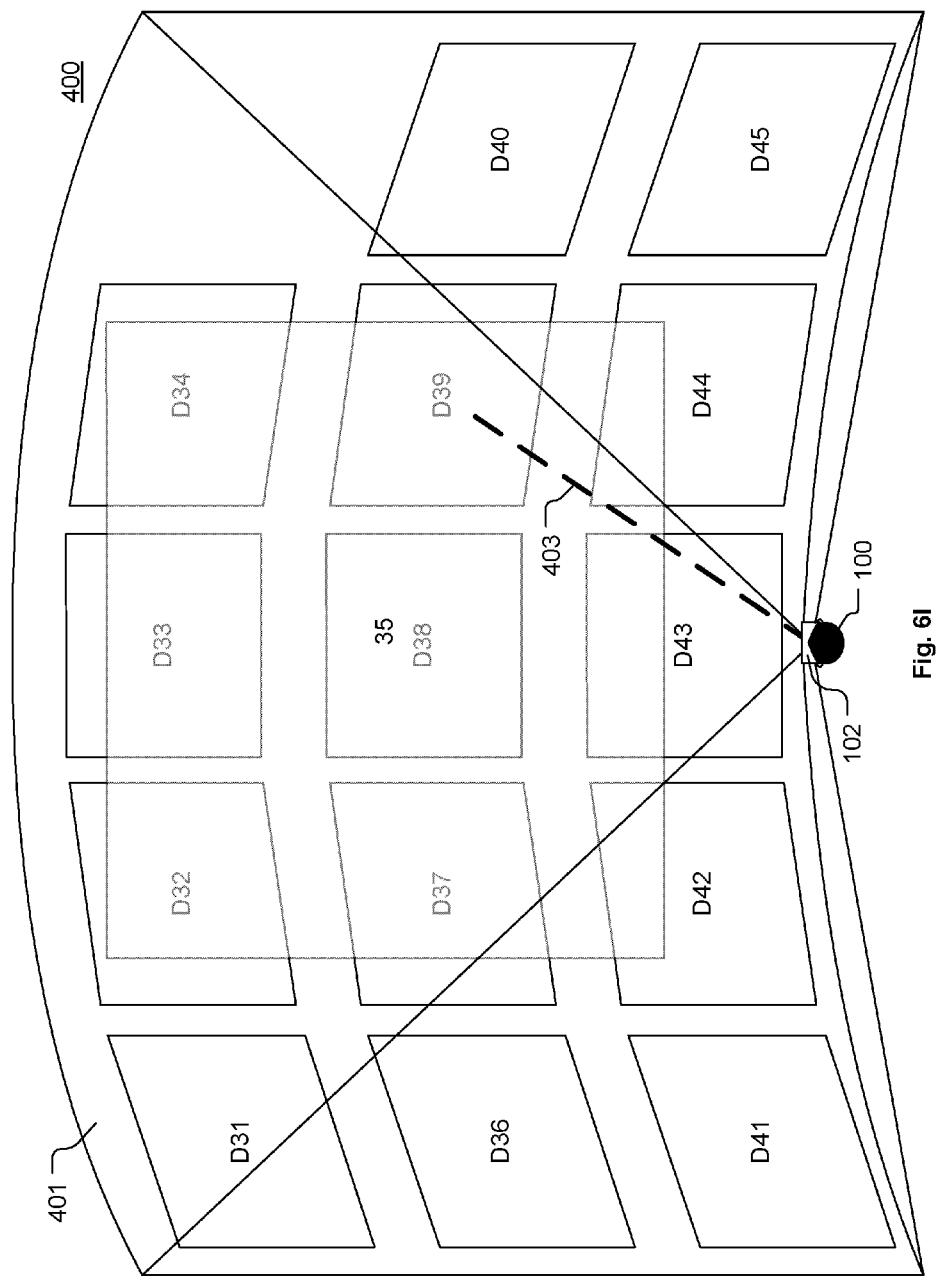

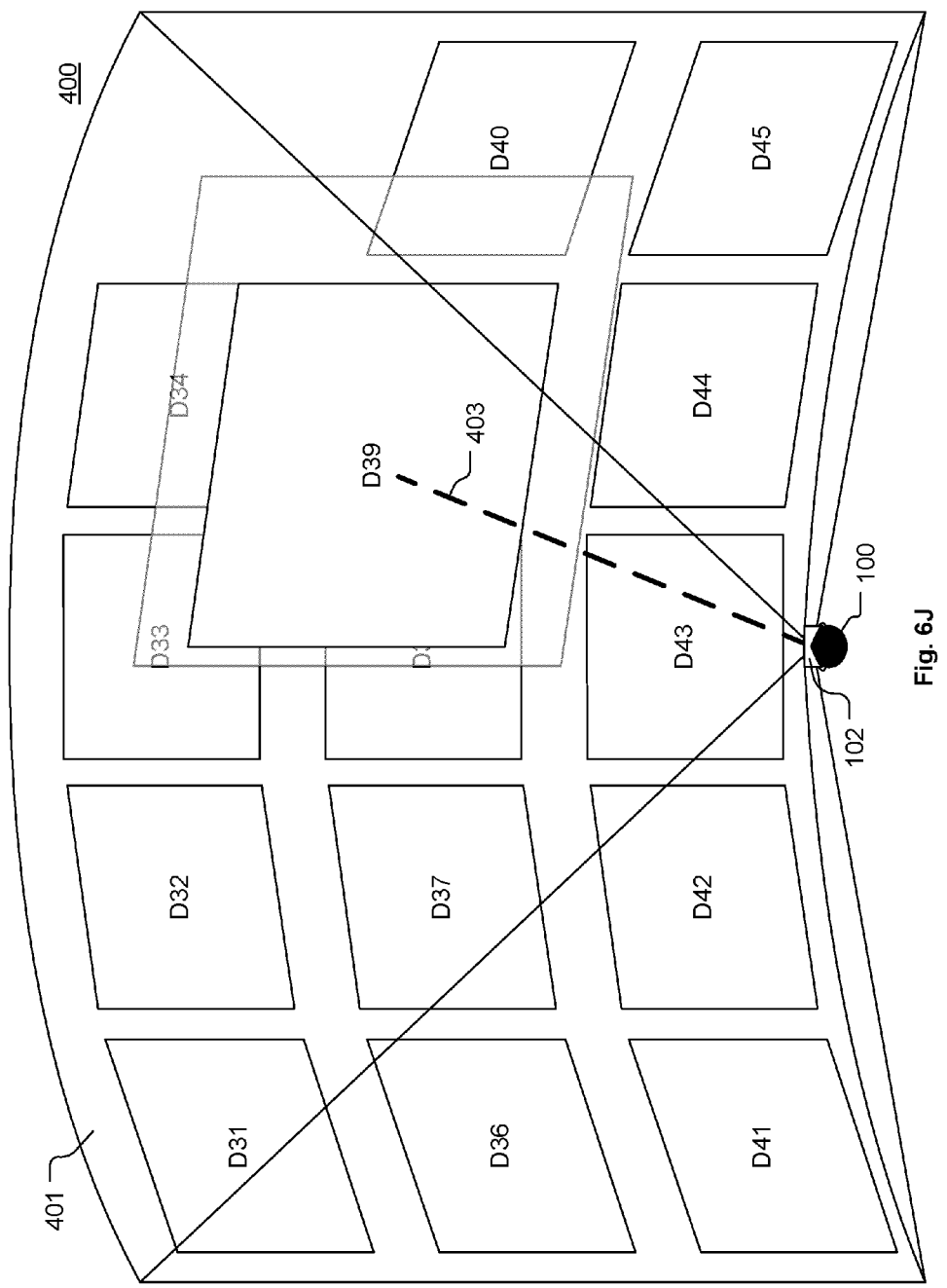

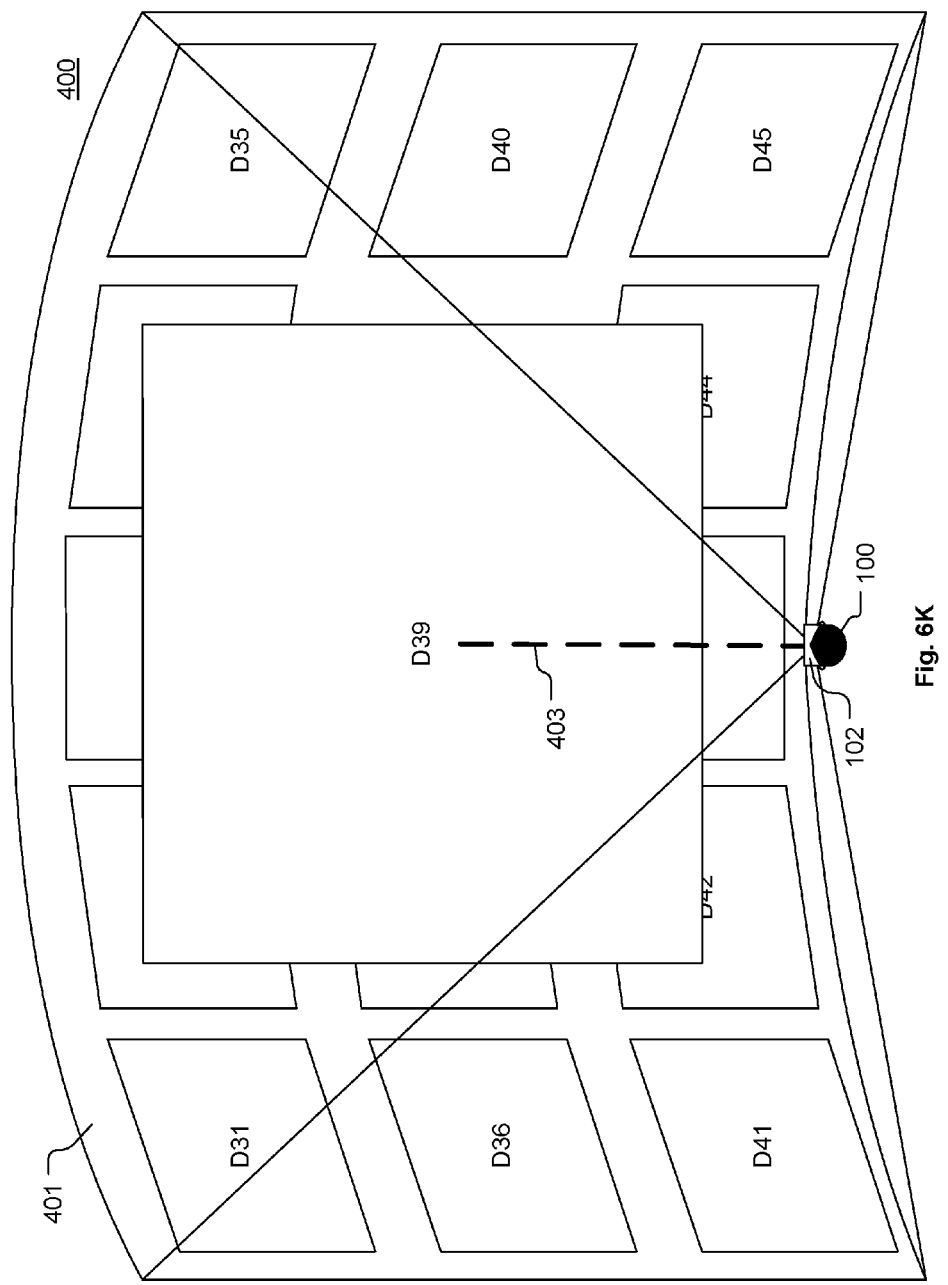

METHODS AND SYSTEMS FOR NAVIGATION WITHIN VIRTUAL REALITY SPACE USING HEAD MOUNTED DISPLAY

BACKGROUND

1. Field of the Invention

The present invention relates to methods and systems for user navigation within a virtual reality space.

2. Description of the Related Art

In virtual reality systems, a user becomes visually immersed in a computer generated three-dimensional virtual reality scene. In some applications, the entire virtual reality scene as displayed to the user is computer generated. In other applications, a portion of the virtual reality scene is computer generated, with another portion of the virtual reality scene corresponding to video and/or images of real-life objects and/or persons, where such real-life video/images can be rendered in the virtual reality scene in essentially real-time. Such applications may be referred to as augmented reality applications.

In many virtual reality applications, it is not only desirable to have the user feel visually immersed in the virtual reality scene, but it is also desirable to provide the user with an ability to select objects displayed within the virtual reality scene for a more focused view. It is within this context that the present invention arises.

SUMMARY

In an example embodiment, a method includes transmitting video data to a head mounted display for display of a virtual reality scene within the head mounted display. The head mounted display is worn by a user. The virtual reality scene includes multiple objects representing display screens of computing sources or information sources. The method also includes detecting movement of the head mounted display. The method also includes generating video data including an adjustment of the virtual reality scene in which a field of view of the user is moved within the virtual reality scene based on the detected movement of the head mounted display. The method also includes transmitting the generated video data including the adjustment of the virtual reality scene in which the field of view of the user is moved within the virtual reality scene to the head mounted display. The method also includes determining a focus direction of the user within the field of view of the user within virtual reality scene, in conjunction with generating video data including the adjustment of the virtual reality scene in which the field of view of the user is moved. The method also includes determining an object of current focus of the user within the virtual reality scene based on the determined focus direction of the user. The focus direction of the user is directed toward the object of current focus of the user. The method also includes generating video data including an adjustment of the virtual reality scene in which the object of current focus of the user moves toward a point of view of the user within the virtual reality scene, upon determining the object of current focus of the user within the virtual reality scene. The method also includes transmitting the generated video data including the adjustment of the virtual reality scene in which the object of current focus of the user moves toward the point of view of the user within the virtual reality scene to the head mounted display.

In an example embodiment, a method includes transmitting video data to a head mounted display for display of a virtual reality scene within the head mounted display. The head mounted display is worn by a user. The method also includes determining an eye gaze direction of the user within the virtual reality scene. The method also includes determining an object of current focus of the user within the virtual reality scene based on the eye gaze direction of the user being directed toward the object of current focus of the user. The method also includes generating video data including an adjustment of the virtual reality scene in which the object of current focus of the user moves toward a point of view of the user within the virtual reality scene, upon determining the object of current focus of the user within the virtual reality scene. The method also includes transmitting the generated video data including the adjustment of the virtual reality scene in which the object of current focus of the user moves toward the point of view of the user within the virtual reality scene to the head mounted display.

In an example embodiment, a system includes a rendering engine for generating video data of a virtual reality scene for display within a head mounted display. The system also includes a focus direction processing module configured to determine a focus direction of a user within the virtual reality scene displayed within the head mounted display. The system also includes an object-of-focus processing module configured to determine an object of current focus of the user within the virtual reality scene based on the focus direction determined by the focus direction processing module. The focus direction of the user is directed toward the object of current focus of the user. The object-of-focus processing module is configured to direct the rendering engine to generate an adjustment of the virtual reality scene in which the object of current focus of the user moves toward a point of view of the user within the virtual reality scene.

Other aspects of the invention will become more apparent from the following detailed description, taken in conjunction with the accompanying drawings, illustrating by way of example the present invention.

BRIEF DESCRIPTION OF THE DRAWINGS

FIG. 3A shows a left head turn movement of the user from the home position, in accordance with an example embodiment of the present invention.

FIG. 3B shows a right head turn movement of the user from the home position, in accordance with an example embodiment of the present invention.

FIG. 3C shows upward head tilt movement of the user from the home position, in accordance with an example embodiment of the present invention.

FIG. 3D shows downward head tilt movement of the user from the home position, in accordance with an example embodiment of the present invention.

FIG. 6A shows an example of the field of view of the user immersed in the virtual reality scene as displayed to the user within the head mounted display, in accordance with some embodiments of the present invention.

FIG. 6C shows the field of view of the user within the virtual reality scene as shown in FIG. 6B, after having determined that the display D36 is the object of current focus of the user, and after the virtual reality scene is adjusted to begin bringing the display D36 toward the user in a spatial manner, in accordance with some embodiments of the present invention.

FIG. 6D shows the field of view of the user within the virtual reality scene as shown in FIG. 6C, after further progress in bringing the display D36 toward the user in the spatial manner, in accordance with some embodiments of the present invention.

FIG. 6E shows the field of view of the user within the virtual reality scene as shown in FIG. 6D, after completion of bringing the display D36 toward the user in the spatial manner, in accordance with some embodiments of the present invention.

FIG. 6F shows the field of view of the user within the virtual reality scene as shown in FIG. 6E, after the user has changed the focus direction from the display D36 to the display D35, in accordance with some embodiments of the present invention.

FIG. 6H shows the field of view of the user within the virtual reality scene as shown in FIG. 6G, after completion of bringing the display D35 toward the user in the spatial manner, in accordance with some embodiments of the present invention.

FIG. 6I shows the field of view of the user within the virtual reality scene as shown in FIG. 6H, after the user has activated the transparency control so as to make the object of current focus of the user transparent, in accordance with some embodiments of the present invention.

FIG. 6J shows the field of view of the user within the virtual reality scene as shown in FIG. 6I, after having determined that the display D39 is the new object of current focus of the user, with the virtual reality scene adjusting to diminish the display D35 back to its normal position and to bring the display D39 toward the user in a spatial manner, in accordance with some embodiments of the present invention.

FIG. 6K shows the field of view of the user within the virtual reality scene as shown in FIG. 6J, after completion of bringing the display D39 toward the user in the spatial manner, in accordance with some embodiments of the present invention.

DETAILED DESCRIPTION

Figure 1A:
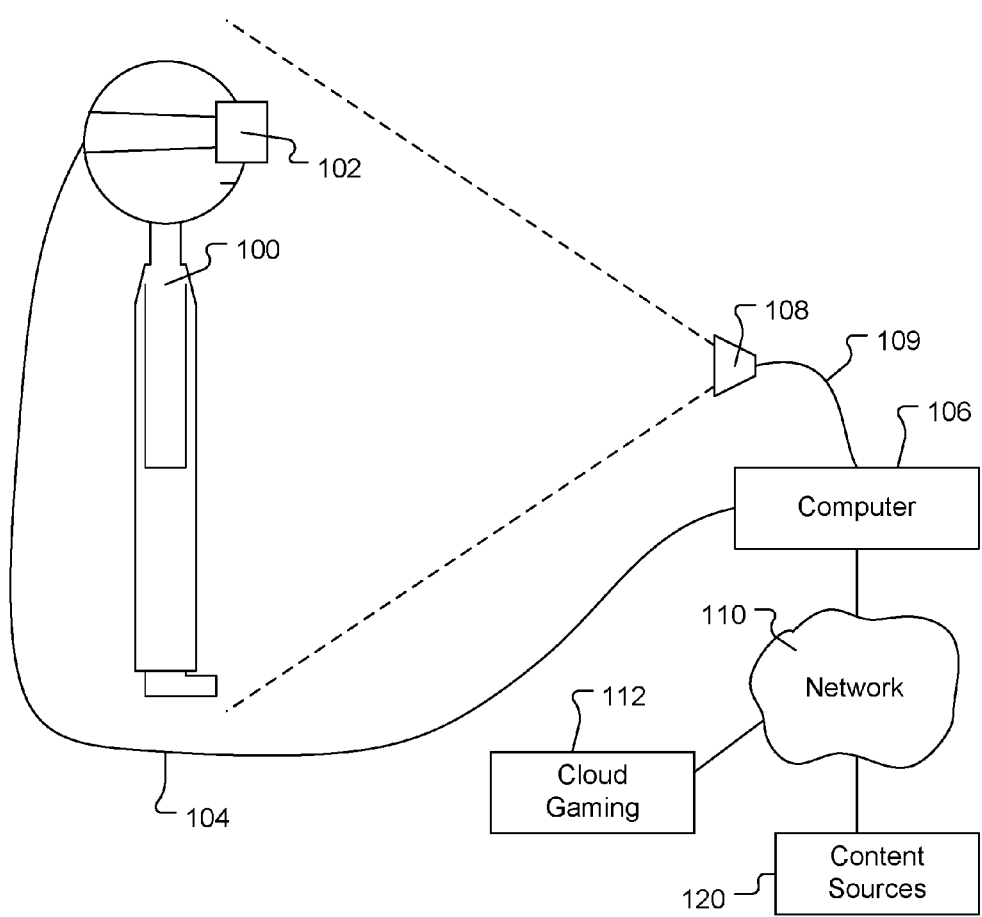
FIG. 1A shows a user wearing a head mounted display that is in communication with a computer system through a wired link, in accordance with an example embodiment of the present invention.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the presented subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein can be implemented using a variety of technologies. For example, the methods described herein are implemented in software executing on a computer system or in hardware utilizing either a combination of microprocessors or other specially designed application-specific integrated circuits (ASICs), programmable logic devices, or various combinations thereof. In particular, the methods described herein are implemented by a series of computer-executable instructions residing on a storage medium such as a disk drive, or computer-readable medium. It should be noted that methods disclosed herein can be implemented by a mobile terminal, cellular phone, smart phone, computer (e.g., a desktop computer, tablet computer, laptop computer), game console, handheld gaming device, and so forth.

The term "head mounted display," as used herein, refers to one or more of the following: a wearable computer having a display, head mounted electronic device, a head-coupled display, a helmet-mounted display, a head-mounted computer with a display. The head mounted display, which is worn on a head of a user or which is a part of a helmet, has a small display optic in front of one (monocular display device) or each eye (binocular display device). The head mounted display has either one or two small display units with lenses and semi-transparent mirrors embedded in a helmet, eye-glasses (also known as data glasses) or visor. The display units can be miniaturized and may include a Liquid Crystal Display (LCD), Organic Light-Emitting Diode (OLED) display, or the like. Some vendors employ multiple micro-displays to increase total resolution and field of view. Some other head mounted displays do not use a traditional display at all and instead project light directly into the user's eyes.

FIG. 1A shows a user 100 wearing a head mounted display 102 that is in communication with a computer system 106 through a wired link 104, in accordance with an example embodiment of the present invention. The head mounted display 102 is worn in a manner similar to glasses, goggles, or a helmet, and is configured to display a video game or other content to the user 100. The head mounted display 102 is configured to provide an immersive experience to the user 100 through operation of its display components, such as optics and display screens, in close proximity to the user's eyes. Also, the format of the video content can be defined to display a virtual reality scene to the user 100 through the head mounted display 102, where the user 100 is made to have a sense of reality of presence within the virtual reality scene. In some embodiments, the head mounted display 102 can provide display regions for each of the user's eyes which occupy large portions or even an entirety of the user's field of view.

The computer system 106 can be any general or special purpose computer, including but not limited to a gaming console, a personal computer, a laptop, a tablet computer, a mobile device, a cellular phone, a tablet, a thin client, a set-top box, a media streaming device, among others. The computer system 106 is configured to render video and audio content and transmit the rendered content through the wired link 104 to the head mounted display 102. It should be understood that although the example of FIG. 1A includes the wired link 104, other embodiments can utilize wireless communication between the head mounted display 102 and the computer system 106, either alone or in combination with communication through the wired link 104. Also, in some embodiments, the head mounted display 102 can connect directly to the Internet.

The content rendered by the computer system 106 can be for essentially any type of computer application, and may include one or more types of content such as game, movie, audio, images, multimedia, among others. In some embodiments, the content, or portions thereof, is generated by the computer system 106. However, in some embodiments, the content, or portions thereof, is streamed from a remote content source 120 over a network 110 to the computer system 106. And, in some embodiments, the content, or portions thereof, is streamed from a cloud gaming infrastructure 112 over the network 110 to the computer system 106. The cloud gaming infrastructure 112 may also direct various types of content to be transmitted from the remote content source 120 over the network 110 to the computer system 106. An example remote content source 120 is an Internet website that provides downloadable content and/or streaming content. The content provided by the remote content source 120 can include any type of multimedia content, such as movies, games, static/dynamic content, pictures, social media content, social media websites, etc. In some embodiments, content data is transmitted from the remote content sources 120 to the computer system 106, where the content data is then rendered by the computer system 106 in a format suitable for use by the head mounted display 102, followed by transmission of the rendered content from the computer system 106 through the wired link 104 to the head mounted display 102.

In some embodiments, the user 100 may operate a controller (not shown) to provide input commands to the computer system 106. Also, in some embodiments, a camera 108 is configured to capture images of the environment in which the user 100 is located. The camera 108 is connected to the computer system 106 as indicated by link 109. The computer system 106 may operate to analyze the images captured by the camera 108 to determine the location and movements of the user 100, the head mounted display 102, and/or the controller. As discussed with regard to FIG. 1B, the head mounted display 102 may include one or more lights which can be used as markers to facilitate tracking of the head mounted display 102 through analysis of the images captured by the camera 108. Also, in some embodiments, the camera 108 can be configured to include multiple image capture devices, such as a stereoscopic pair of cameras, an infrared camera, a depth camera, or combinations thereof. In some embodiments, one or microphones (not shown) can be used to capture sound from the user 100 and/or from the environment in which the user 100 is located, for processing by the computer system 106.

In some embodiments, the computer system 106 is configured to execute games locally on the processing hardware of the computer system 106. The games or content can be obtained in any form, such as physical media form (e.g., digital discs, tapes, cards, thumb drives, solid state chips or cards, etc.) or by way of download from the Internet, via network 110. In some embodiments, the computer system 106 functions as a client in communication over the network 110 with the cloud gaming infrastructure 112. The cloud gaming infrastructure 112 may maintain and execute the video game being played by the user 100. The computer system 106 can be defined to transmit inputs received from the head mounted display 102, the controller, and the camera 108, to the cloud gaming infrastructure 112, which processes the inputs to affect the game state of the executing video game.

In some embodiments, the head mounted display 102, controller, and camera 108, may themselves be networked devices that connect to the network 110 to communicate with the cloud gaming infrastructure 112. For example, the computer system 106 may be a local network device, such as a router, that does not otherwise perform video game processing, but facilitates passage of network traffic. The connections to the network 110 by the head mounted display 102, the controller, and the camera 108 may be wired or wireless.

Game data from the executing video game, such as video data, audio data, and tactile feedback data, can be transmitted from the cloud gaming infrastructure 112 and/or content sources 120 to the computer system 106. The computer system 106 may further process the game data before transmission to the appropriate device, or may directly transmit the game data to the appropriate device. For example, video and audio streams may be transmitted to the head mounted display 102, whereas a vibration feedback command may be transmitted to the controller.

Figure 1B:
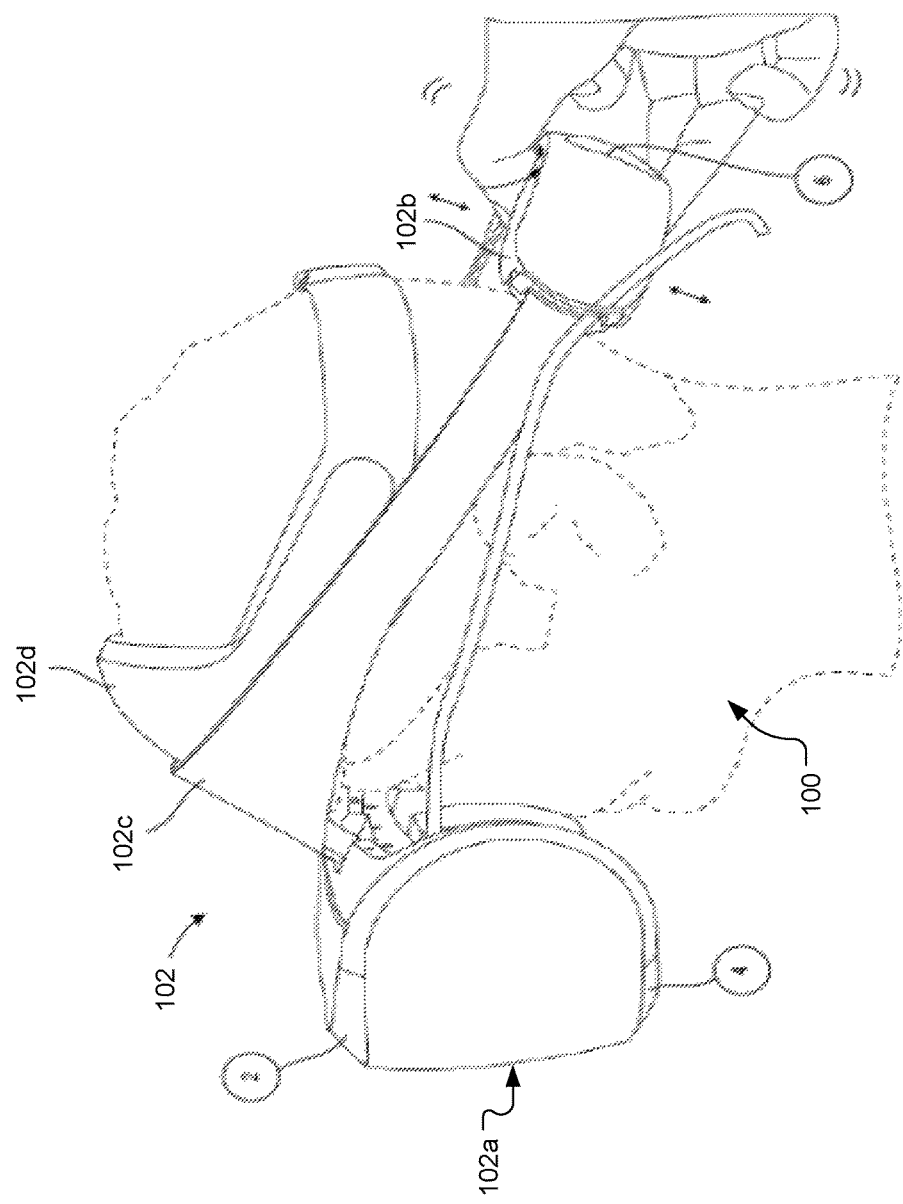
FIG. 1B shows an example head mounted display worn by the user for viewing and/or interacting with multimedia content, in accordance with an example embodiment of the present invention.

FIG. 1B shows an example head mounted display 102 worn by the user 100 for viewing and/or interacting with multimedia content, in accordance with an example embodiment of the present invention. The head mounted display 102 allows the user 100 to view rich multimedia content, including interactive scenes from video games, scenes from movies, Internet content, and other types of interactive and non-interactive content. The tracking of position and movement (including orientation, location, direction, etc.) of the head mounted display 102 is enabled by inertial sensors onboard the head mounted display 102 and by tracking a plurality of marker elements, such as light emitting diodes, infra-red markers, visual marker elements, etc., distributed across different external surfaces of the head mounted display 102, using a combination of sensors or based on one or more variables used to define a volume surrounding the head mounted display 102. Some of the sensors used for tracking include, without limitation, inertial sensors within the head mounted display 102 that allow movement tracking of the head mounted display 102, one or more image sensors and one or more depth sensors, wherein the image sensors and depth sensors allow optical tracking. The tracking using inertial sensors may be enabled using one or more accelerometers and one or more gyroscopes that are disposed within the head mounted display 102.

The image sensors may include one or more single-lens camera, infrared camera, stereo camera, etc. And, depth sensors may include one or more depth sensing cameras, ultrasonic camera, three-dimensional (3D) stereo cameras, video cameras, etc. The image sensors and depth sensors encompass one or more cameras provided within the head mounted display 102 as well as external cameras that are dispersed within a real-world environment of the user 100 wearing the head mounted display 102, such as camera 108. The image sensors and/or the depth sensors within the head mounted display 102, for example, are used to capture images/videos of the real-world objects/scenes in the immediate vicinity of the user 100 from the perspective of the user 100 wearing the head mounted display 102. The captured images/videos may be rendered in the display portion of the head mounted display 102 when content is being generated.

Also, the captured images/video can be presented to the user 100 on the display of the head mounted display 102 to provide the user 100 with a "video see-through" ability while wearing the head mounted display 102. That is, though the user 100 cannot see through the head mounted display 102 in a strict sense, the video captured by the image capture devices of the head mounted display 102 can nonetheless provide a functional equivalent of being able to see the environment external to the head mounted display 102 as if the head mounted display 102 were transparent. Such video can be augmented with virtual elements to provide an augmented reality experience, or may be combined or blended with virtual elements in other ways. For ease of description, the term "virtual reality scene" as used herein refers to a display of video within the head mounted display 102 that is either a completely computer generated virtual reality scene or an augmented reality scene.

The image and/or depth sensors distributed externally within the scene of the user 100, for example, are configured to capture images/videos of the various markers, such as lights, light emitting diodes (LEDs), infra-red markers, etc., distributed across the external surface of the head mounted display 102. In one embodiment, the images/videos are transmitted to the computer system 106 where the images/video frames are analyzed to accurately determine the location of the head mounted display 102. Additionally, the images/videos can be analyzed within the computer processing capability of the head mounted display 102 to determine the location, orientation, direction of the head mounted display 102 with reference to other objects in the real-world scene.

In one configuration, the head mounted display 102 includes LEDs (for example, represented by bubbles 2, 4 and 6 in FIG. 1B) disposed at strategic locations on one or more external surfaces of the head mounted display 102. For instance, the LEDs may be disposed on the four corners of the front block unit 102a (e.g., also referred to as the optics block) of the head mounted display 102 and two on the rear/back section 102b of the head mounted display 102. In some embodiments, the rear/back section 102b is disposed on an adjustable band unit. The head mounted display 102 may also include other surfaces, such as 102c and 102d to allow the user to safely and securely position the head mounted display 102 on the head of the user 100. In some embodiments, the front LEDs are configured to be partially disposed on the front surface of the front block unit 102a and partially on side surfaces of the front block unit 102a that are disposed on each side of the front surface, to define a partial L-shape, a curved L-shape, a boomerang shape, a curved rectangle, a curved line, a spot, a circle, a pattern, or combinations thereof. The markers are not restricted to LEDs but can also include lights, infra-red markers, color coded markers, reflective markers, etc.

The analysis of the images/video frames are used to compute relative distance of the different markers of the head mounted display 102 from one another and from one or more reference points. The computed distances are used to determine a volume around the head mounted display 102 and changes to the volume during use to more accurately define the position of the head mounted display 102. Additionally, in some embodiments, the video frames/images captured by the various sensors are analyzed to assist in determining position of the various makers in terms of orientation, location, and direction of movement in order to more accurately determine the direction of movement or position of the user 100 wearing the head mounted display 102.

Also, as discussed herein, the inertial sensors onboard the head mounted display 102 generate inertial sensor data that can be analyzed/processed to determine the position, direction of movement, and rate of movement of the head mounted display 102, in order to determine an action and/or gesture made by the user 100 as an input to the application executing to generate the virtual reality scene displayed in the head mounted display 102. In some embodiments, the inertial sensors can be used without the other markers of the head mounted display 102 to determine the position, direction of movement, and rate of movement of the head mounted display 102. In some embodiments, the inertial sensors can be used in combination with the other markers of the head mounted display 102 to determine the position, direction of movement, and rate of movement of the head mounted display 102.

In some embodiments, the head mounted display 102 is configured to provide a view into an interactive virtual reality scene of a computer application. For example, some computer applications that may support virtual reality scene generation and display through the head mounted display 102 include games (such as first person shooter games), virtual tours (such as hotels, travel sites, global placed of interest, augmented reality applications (such as for virtual meetings, collaboration between remote users, shared/synchronized virtual spaces), and augmented reality medical applications (such as remote examination, examination assistance, remote surgery, remote surgery assistance), among others. In the various computer applications, the user 100 wearing the head mounted display 102 will be able to move their head in any direction to view other parts of the virtual reality scene. And, in the case of an interactive virtual reality scene, movement of the head mounted display 102 by way of movement of the user's head can be used to provide inputs to control movement of the user and/or other objects within the virtual reality scene, and/or take other actions within the virtual reality scene, such as zooming a view of the user in and out relative to an object present within the virtual reality scene.

Because the interactive content that can be rendered in the virtual reality scene in the head mounted display 102 is virtually boundless, a user is able to view and interact with the virtual reality scene in most every dimension. Tracking of the user's movement can include the use of the inertial sensors that are disposed within the head mounted display 102. The inertial sensors can include one or more accelerometers (such as a MEMS inertial accelerometer, among others) and/or one or more gyroscopes (such as a ring laser gyroscope, a fiber optic gyroscope, a MEMS gyroscope, among others). Some implementations of the head mounted display 102 may include more or less inertial sensors.

For ease of description, the term "inertial sensor" as used herein refers to any type of inertial sensor that is capable of detecting/sensing movement of itself without an external reference. The inertial sensor generates inertial sensor data that provides information about the direction and rate of movement of the inertial sensor. With the inertial sensors fixed within the head mounted display 102, the inertial sensor data can be analyzed to determine the direction and rate of movement of the head mounted display 102, which in turn can be analyzed to determine the direction and rate of movement of the user 100 wearing the head mounted display 102. In this manner, movements of the user as determined through analysis of the inertial sensor data can be used as inputs to the computer application executing to generate and render the virtual reality scene.

Therefore, through analysis of the inertial sensor data, the user is able to act as a human controller to affect specific actions within the interactive virtual reality scene. And, in some embodiments, the movements of the user and corresponding actions within the virtual reality scene can be naturally related to each other. For example, inertial sensor data indicating a lean forward by the user may be used by the computer application as an input to cause the user's viewpoint to move forward within the virtual reality scene. It should be appreciated that the types of user movement and corresponding actions within the virtual reality scene are essentially limitless, depending on the range of possible movements of the human body and the context of any given virtual reality scene.

Figure 2A:
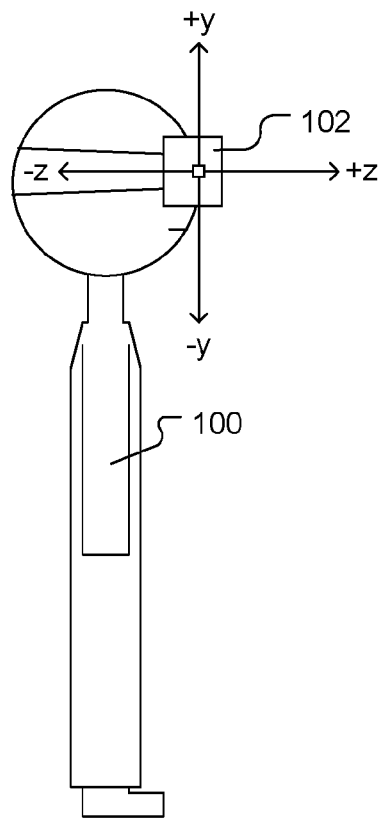
FIG. 2A shows a side view of the user wearing the head mounted display, with the user in a home position, in accordance with an example embodiment of the present invention.
Figure 2B:
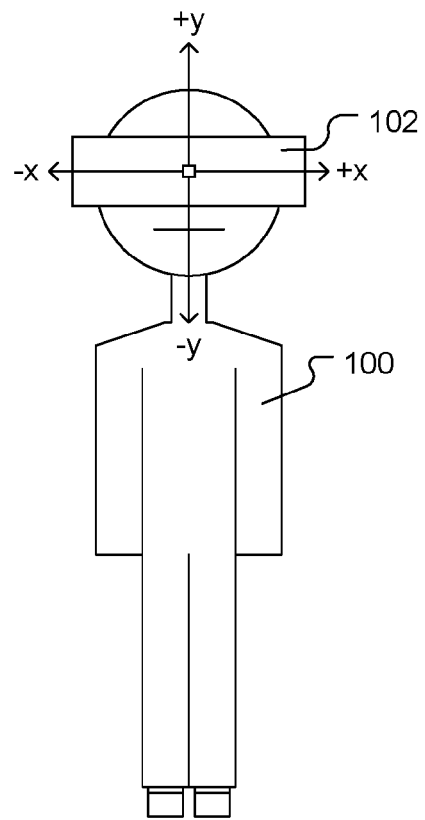
FIG. 2B shows a front view of the user wearing the head mounted display, with the user in the home position, in accordance with an example embodiment of the present invention.
Figure 2C:
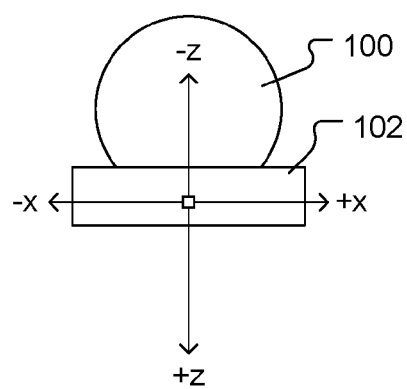
FIG. 2C shows a top view of the user wearing the head mounted display, with the user in the home position, in accordance with an example embodiment of the present invention.

FIG. 2A shows a side view of the user 100 wearing the head mounted display 102, with the user in a home position relative to a reference Cartesian coordinate system defined by x, y, z axes, in accordance with an example embodiment of the present invention. FIG. 2B shows a front view of the user 100 wearing the head mounted display 102, with the user in the home position relative to the reference Cartesian coordinate system defined by x, y, z axes, in accordance with an example embodiment of the present invention. FIG. 2C shows a top view of the user 100 wearing the head mounted display 102, with the user in the home position relative to the reference Cartesian coordinate system defined by x, y, z axes, in accordance with an example embodiment of the present invention.

FIG. 3A shows a left head turn movement of the user 100 from the home position, in accordance with an example embodiment of the present invention. The left head turn movement of the user 100 causes the inertial sensor(s) onboard the head mounted display 102 to generate inertial sensor data that when analyzed reveals the left head turn direction of movement as indicated by arrow 209. The left head turn direction of movement, as determined through analysis of the inertial sensor data, can be used to affect an action within the virtual reality scene displayed in the head mounted display 102, such as causing a view of the user to pan left, among other possible actions commensurate with the context of the virtual reality scene that is currently displayed to the user 100 within the head mounted display 102.

FIG. 3B shows a right head turn movement of the user 100 from the home position, in accordance with an example embodiment of the present invention. The right head turn movement of the user 100 causes the inertial sensor(s) onboard the head mounted display 102 to generate inertial sensor data that when analyzed reveals the right head turn direction of movement as indicated by arrow 211. The right head turn direction of movement, as determined through analysis of the inertial sensor data, can be used to affect an action within the virtual reality scene displayed in the head mounted display 102, such as causing a view of the user to pan right, among other possible actions commensurate with the context of the virtual reality scene that is currently displayed to the user 100 within the head mounted display 102.

FIG. 3C shows upward head tilt movement of the user 100 from the home position, in accordance with an example embodiment of the present invention. The upward head tilt movement of the user 100 causes the inertial sensor(s) onboard the head mounted display 102 to generate inertial sensor data that when analyzed reveals the upward head tilt direction of movement as indicated by arrow 213. The upward head tilt direction of movement, as determined through analysis of the inertial sensor data, can be used to affect an action within the virtual reality scene displayed in the head mounted display 102, such as causing a view of the user to pan upward, among other possible actions commensurate with the context of the virtual reality scene that is currently displayed to the user 100 within the head mounted display 102.

FIG. 3D shows downward head tilt movement of the user 100 from the home position, in accordance with an example embodiment of the present invention. The downward head tilt movement of the user 100 causes the inertial sensor(s) onboard the head mounted display 102 to generate inertial sensor data that when analyzed reveals the downward head tilt direction of movement as indicated by arrow 215. The downward head tilt direction of movement, as determined through analysis of the inertial sensor data, can be used to affect an action within the virtual reality scene displayed in the head mounted display 102, such as causing a view of the user to pan downward, among other possible actions commensurate with the context of the virtual reality scene that is currently displayed to the user 100 within the head mounted display 102.

It should be understood that the particular user 100 movements described with regard to FIGS. 3A-3D are examples of a broader set of possible user 100 movements. Therefore, although the particular user 100 movements described with regard to FIGS. 3A-3D may be considered primary movements, these particular user 100 movements are in no way exhaustive of all possible user 100 movements. Analysis of the inertial sensor data can reveal any direction of user 100 movement that may occur, including the particular user 100 movements depicted in FIGS. 3A-3D and any direction of user 100 movement therebetween. Also, any action within the virtual reality scene that is commensurate with the context of the virtual reality scene can be correlated to any user 100 movement detectable through analysis of the inertial sensor data received from the inertial sensors within the head mounted display 102.

Figure 4A:
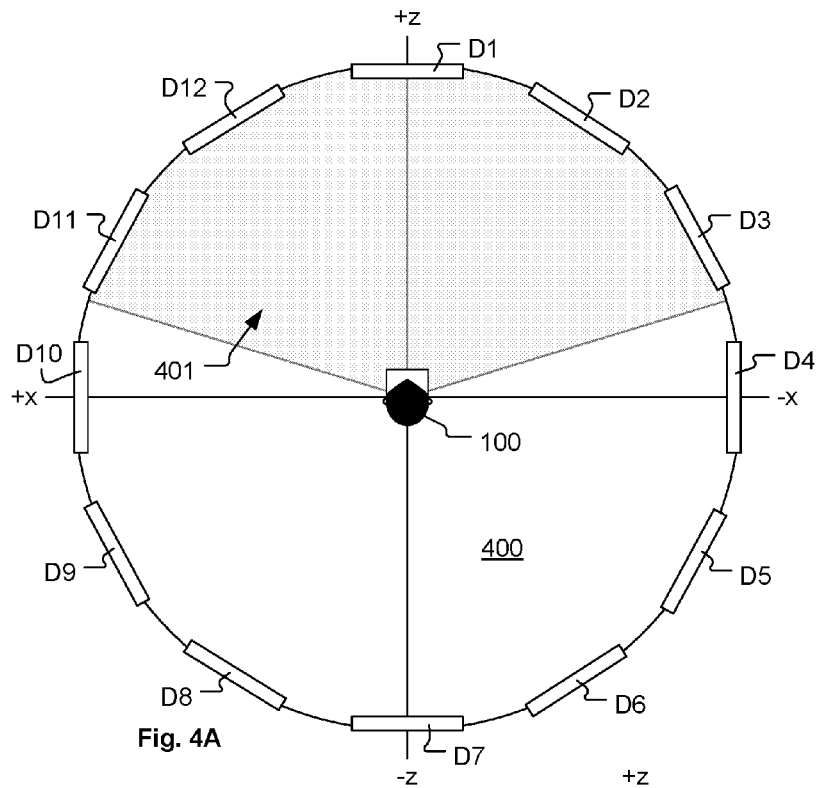
FIG. 4A shows a top view of the user immersed in a virtual reality scene in which a number of displays D1-D12 are shown positioned in an arrangement that surrounds the user within a horizontal plane, in accordance with some embodiments of the present invention.

FIG. 4A shows a top view of the user 100 immersed in a virtual reality scene 400 in which a number of displays D1-D12 are shown positioned in an arrangement that surrounds the user 100 within a horizontal plane, i.e., within the x-z reference plane, in accordance with some embodiments of the present invention. For description purposes, FIG. 4A includes twelve displays D1-D12. However, it should be understood that the twelve displays D1-D12 of FIG. 4A is not limiting. In various embodiments, essentially any number of displays can be included within the virtual reality scene 400. Also, while FIG. 4A shows the displays D1-D12 arranged in a circular manner for description purposes, it should be understood that in other embodiments the displays D1-D12 can be arranged in essentially any geometric configuration within the virtual reality scene 400.

In some embodiments, each of the displays D1-D12 rendered in the virtual reality scene 400 represents a virtual display screen of a computing source. Because the displays D1-D12 are independent of each other, each display D1-D12 can provide different visual and/or audio content, and each display D1-D12 can be associated with a different computing source. For example, some of the displays D1-D12 may provide visual and/or audio content for various applications of interest to the user 100 such as an email application, a social media application, a news application, a website, a productivity application (e.g., word processing, spreadsheet, etc.), a gaming application, or essentially any other type of computer application or information source.

In FIG. 4A, the virtual reality scene 400 displayed to the user 100 within the head mounted display 102 at a given time corresponds to a given field of view 401 within the virtual reality scene 400. In other words, the user 100 is able to see a portion of the entire virtual reality scene 400 at a given time consistent with the field of view 401. In this manner, the user 100 is able to see a portion of the displays D1-D12 at a given time that fit within the field of view 401. For example, in FIG. 4A, the user is able to see displays D11, D12, D1, D2, and D3 because they are within the field of view 401 of the user 100.

Figure 4B:
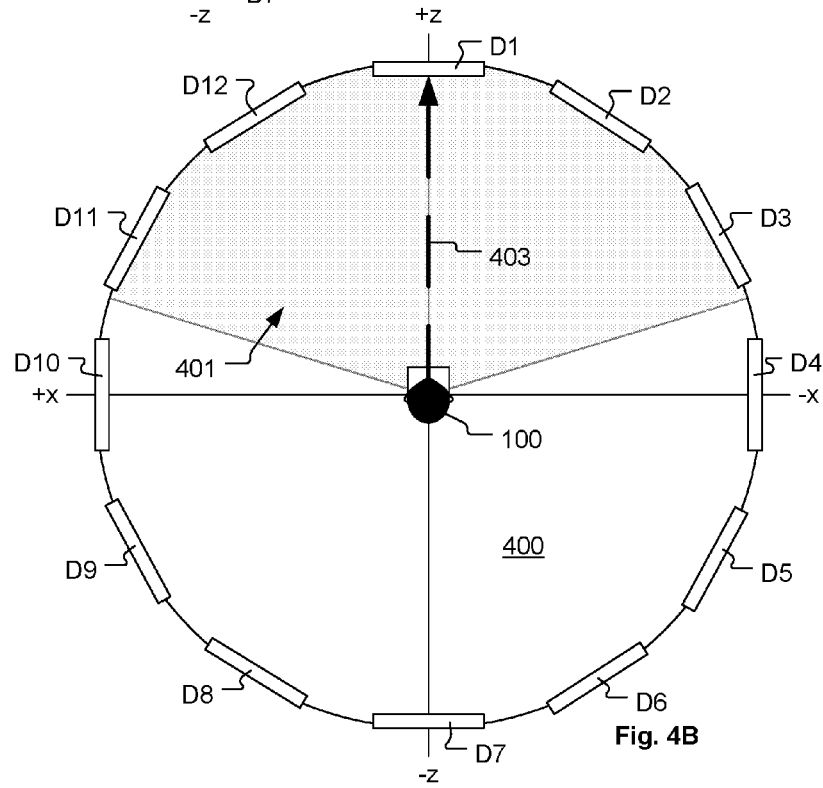
FIG. 4B shows the top view of the user immersed in the virtual reality scene as shown in FIG. 4A, with depiction of a focus direction toward the display D1, in accordance with some embodiments of the present invention.

FIG. 4B shows the top view of the user 100 immersed in the virtual reality scene 400 as shown in FIG. 4A, with depiction of a focus direction 403 toward the display D1, in accordance with some embodiments of the present invention. The focus direction 403 can be determined in various ways. For example, inertial sensor and/or marker elements within the head mounted display 102 can be used to determine an orientation of the head mounted display. And, the determined orientation of the head mounted display 102 can be correlated to the particular field of view 401 within the virtual reality scene 400. For example, in some embodiments, the focus direction is centered within the particular field of view 401. Also, in some embodiments, the head mounted display 102 is equipped to determine an eye gaze direction of the user 100, i.e., eye focus direction of the user 100, which can be used either alone or in combination with the determined orientation of the head mounted display 102 to determine the focus direction 403 of the user 100. It should be understood that by determining and using the eye gaze direction of the user 100, it is possible for the focus direction 403 of the user 100 to be non-centered within the field of view 401.

Figure 4C:
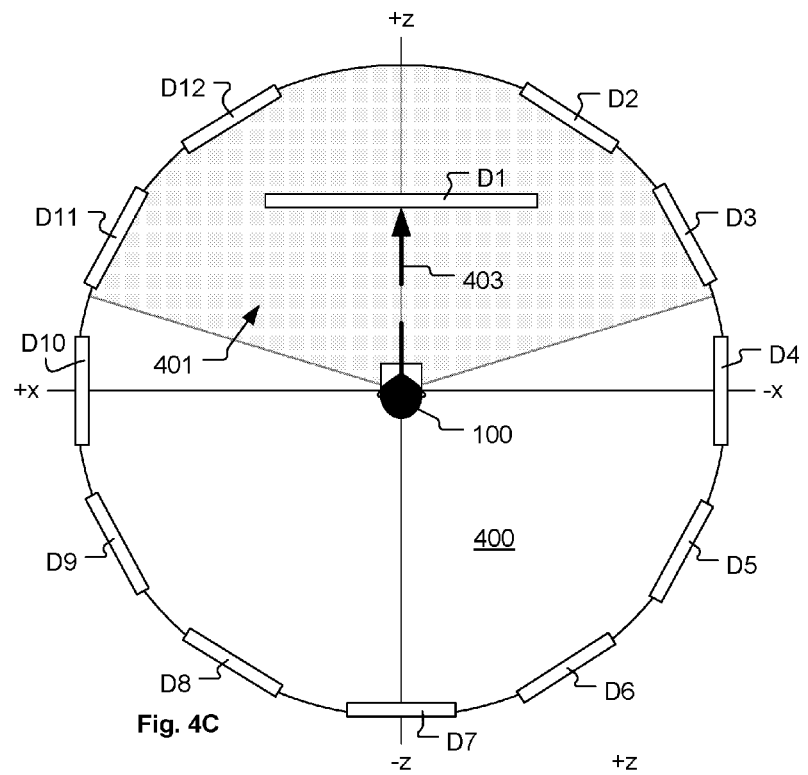
FIG. 4C shows the top view of the user immersed in the virtual reality scene as shown in FIG. 4B, after having determined that the display D1 is the object of current focus of the user 100, and after the virtual reality scene is adjusted to bring the display D1 toward the user in a spatial manner, in accordance with some embodiments of the present invention.

Once the focus direction 403 of the user 100 is determined, the focus direction 403 is used to determine which of the displays D1-D12 is the object of current focus of the user 100. For example, in FIG. 4B, using the determined focus direction 403, it is determined that the display D1 is the object of current focus of the user 100. Upon determining the object of current focus of the user 100, the virtual reality scene 400 is adjusted to bring the object of current focus of the user 100 toward the user 100 in a spatial manner, such that an enlarged version of the object of current focus of the user 100 is positioned prominently in front of the user 100, i.e., prominently in the field of view of the user 100. FIG. 4C shows the top view of the user 100 immersed in the virtual reality scene 400 as shown in FIG. 4B, after having determined that the display D1 is the object of current focus of the user 100, and after the virtual reality scene 400 is adjusted to bring the display D1 toward the user 100 in a spatial manner, in accordance with some embodiments of the present invention.

In some embodiments, when the object of current focus of the user 100 is determined, an audio feed to the user is adjusted to include audio content associated with the object of current focus of the user 100. For example, in FIG. 4C, if the display D1 is showing a video stream of a video game, the audio feed to the user may be adjusted to include audio content associated with the video stream of the video game, where such audio content may include game audio and/or player voice audio and/or spectator voice audio.

In some embodiments, once the object of current focus of the user 100 has been determined and brought forth to the user 100 within the virtual reality scene 400, the user 100 may be allowed to interact with the object of current focus of the user 100. For example, in FIG. 4C, if the display D1 is showing the video stream of the video game, the user 100 may be allowed to change an aspect of how the video game is viewed, and/or communicate with players of the video game, and/or enter into play of the video game, and/or perform essentially any other types of actions associated with the video game. In another example, in FIG. 4C, if the display D1 is showing an email application of the user, the user 100 may be allowed to interact with the email application once the display D1 is identified as the object of current focus of the user 100.

It should be understood that the visual content and audio content of the various displays D1-D12 can be essentially any type of content associated with essentially any type of computer application and/or information source. And, it should be understood that the ways in which the user 100 can interact with the applications underlying the visual content and audio content of the various displays D1-D12 are unrestricted, so long as the underlying applications support the particular type of user 100 interaction. Therefore, generally speaking, once the object of current focus of the user 100, e.g., one or more of displays D1-D12, has been determined, the object of current focus of the user 100 is brought toward the user 100 within the virtual reality scene 400, and the user 100 may be provided with an audio feed associated with the object of current focus of the user 100, and the user may be allowed to interact with the object of current focus of the user 100.

Figure 4D:
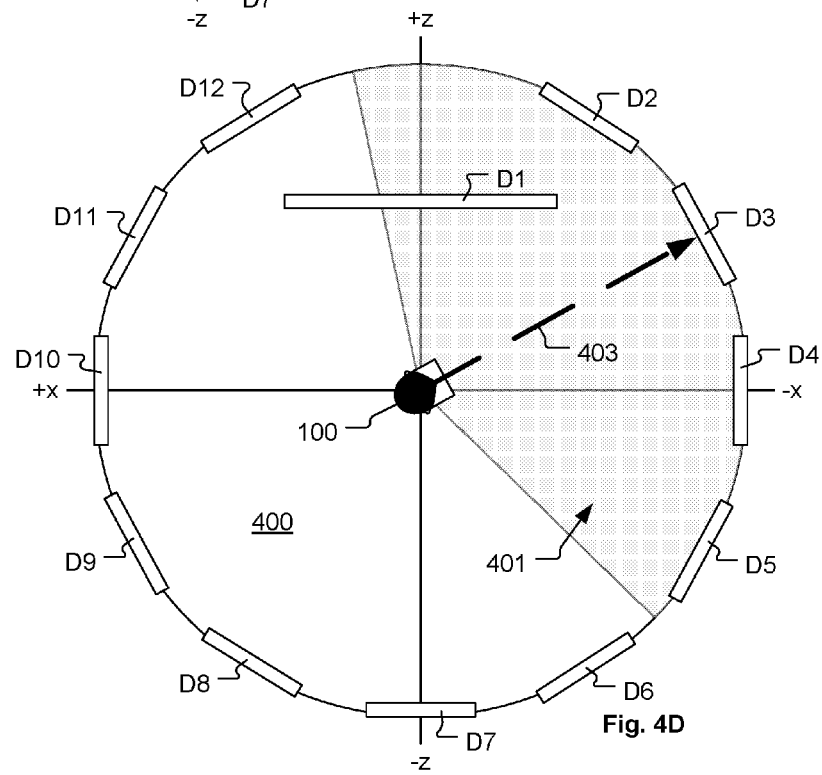
FIG. 4D shows the top view of the user immersed in the virtual reality scene as shown in FIG. 4C, with the user having changed their focus direction, in accordance with some embodiments of the present invention.

In general, within the virtual reality scene 400, the user 100 is free to change their focus direction 403 at any time for any reason. FIG. 4D shows the top view of the user 100 immersed in the virtual reality scene 400 as shown in FIG. 4C, with the user 100 having changed their focus direction 403, in accordance with some embodiments of the present invention. In the example of FIG. 4D, the user 100 has turned their head to the right within the horizontal plane, i.e., x-z plane, which has caused a rotation of the field of view 401 of the user 101 toward the right within the virtual reality scene 400, so as to bring into view displays D1, D2, D3, D4, and D5, and such that the display D3 has become the object of current focus of the user 100.

Figure 4E:
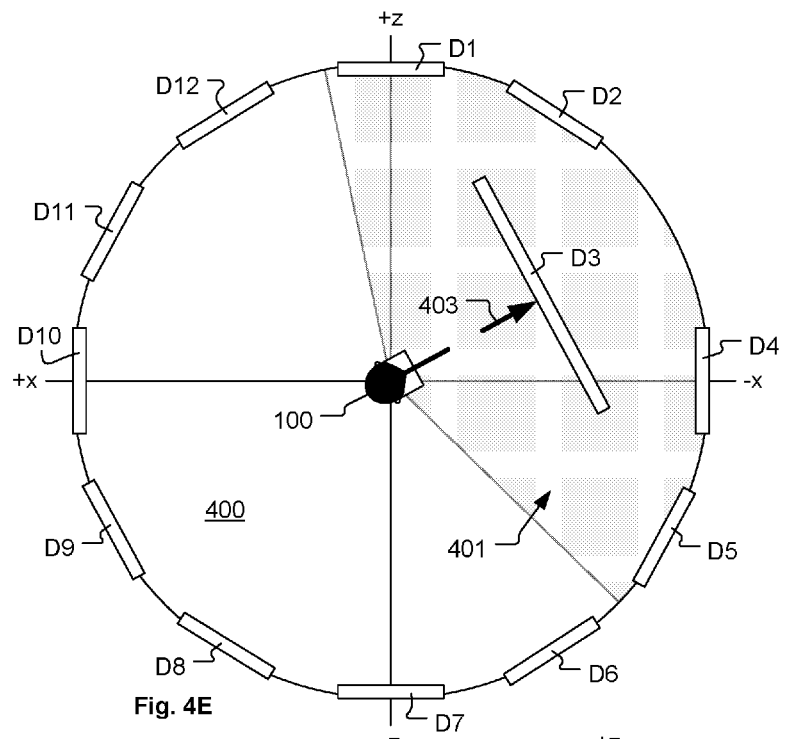
FIG. 4E shows the top view of the user immersed in the virtual reality scene as shown in FIG. 4D, after having determined that the display D3 is the new object of current focus of the user, and after the virtual reality scene is adjusted to diminish the display D1 to its normal position and to bring the display D3 toward the user in a spatial manner, in accordance with some embodiments of the present invention.

Upon determining that the object of current focus of the user 100 has moved from display D1 to display D3, the virtual reality scene 400 changes to diminish the prominence of the display D1 back toward its normal position, while simultaneously bringing the display D3 (the object of current focus of the user 100) toward the user 100 in a spatial manner, such that an enlarged version of the display D3 is positioned prominently in front of the user 100. FIG. 4E shows the top view of the user 100 immersed in the virtual reality scene 400 as shown in FIG. 4D, after having determined that the display D3 is the new object of current focus of the user 100, and after the virtual reality scene 400 is adjusted to diminish the display D1 to its normal position and to bring the display D3 toward the user 100 in a spatial manner, in accordance with some embodiments of the present invention. Also, as previously stated, in some embodiments, when the object of current focus of the user 100 is determined, an audio feed to the user can be adjusted to include audio content associated with the object of current focus of the user 100. In the example of FIG. 4E, the audio feed to the user 100 can be adjusted to include audio content associated with the display D3.

Figure 4F:
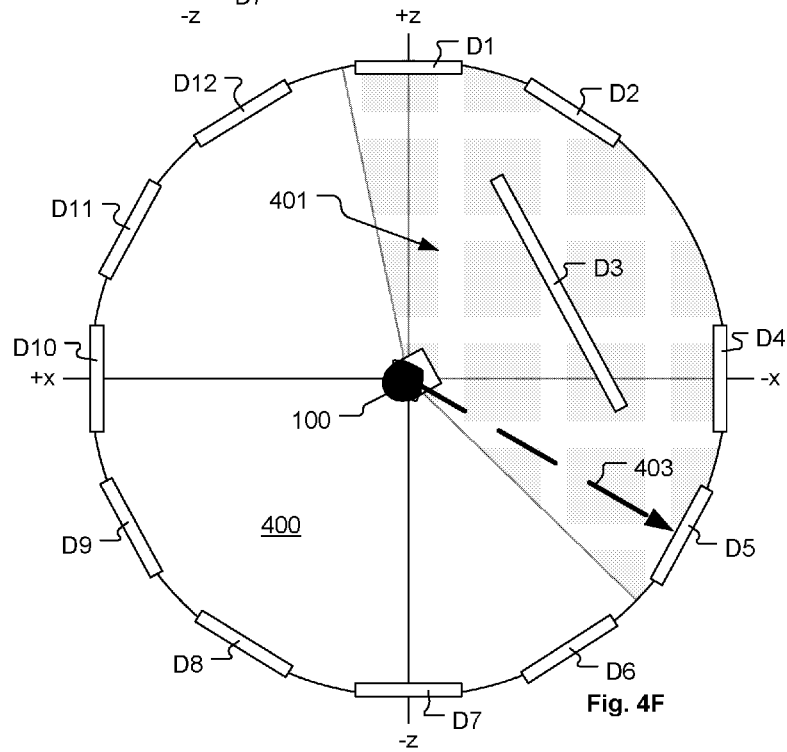
FIG. 4F shows the top view of the user immersed in the virtual reality scene as shown in FIG. 4E, with the user having changed their focus direction toward display D5, in accordance with some embodiments of the present invention.

FIG. 4F shows the top view of the user 100 immersed in the virtual reality scene 400 as shown in FIG. 4E, with the user 100 having changed their focus direction 403 toward display D5, in accordance with some embodiments of the present invention. The head mounted display 102 can be equipped to determine the eye gaze direction of the user 100 and determine that the eye gaze direction of the user 100 represents a new focus direction 403 of the user toward the display D5. Therefore, it should be understood that in some embodiments, the focus direction 403 of the user, and changes thereof, can be determined based on the eye gaze direction of the user 100 separate from the orientation and movement of the head mounted display 102. However, in some embodiments, the focus direction 403 of the user, and changes thereof, can be determined based solely on the orientation and movement of the head mounted display 102. And, in some embodiments, the focus direction 403 of the user, and changes thereof, can be determined based on a combination of the eye gaze direction of the user 100 and the orientation and movement of the head mounted display 102.

Also, as previously stated, in some embodiments, when the object of current focus of the user 100 is determined, an audio feed to the user can be adjusted to include audio content associated with the object of current focus of the user 100. In the example of FIG. 4F, the audio feed to the user 100 can be adjusted to include audio content associated with the display D5 as soon as it is determined that the user 100 has changed their focus direction 403 toward display D5.

Figure 4G:
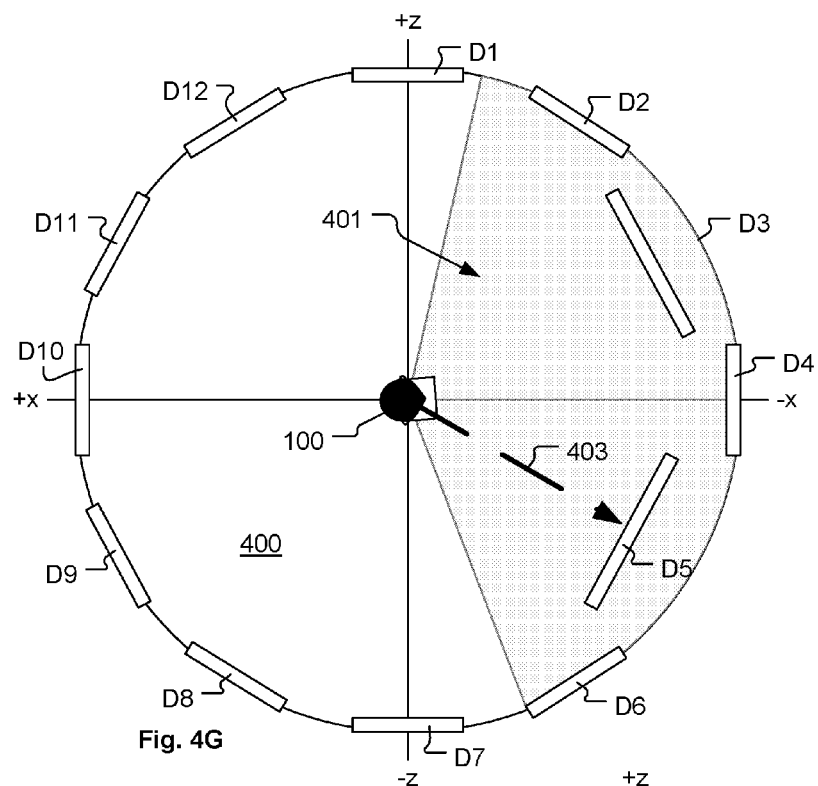
FIG. 4G shows the top view of the user immersed in the virtual reality scene as shown in FIG. 4F, after having determined that the display D5 is the new object of current focus of the user, in accordance with some embodiments of the present invention.

With reference to FIG. 4F, upon determining that the focus direction 403 of the user 100 has changed from the display D3 to the display D5, the virtual reality scene 400 changes to diminish the prominence of the display D3 back toward its normal position, while simultaneously bringing the display D5 (the object of current focus of the user 100) toward the user 100 in a spatial manner, such that an enlarged version of the display D5 is positioned prominently in front of the user 100. FIG. 4G shows the top view of the user 100 immersed in the virtual reality scene 400 as shown in FIG. 4F, after having determined that the display D5 is the new object of current focus of the user 100, in accordance with some embodiments of the present invention. FIG. 4G shows the virtual reality scene 400 adjusting to diminish the display D3 back to its normal position and to bring the display D5 toward the user 100 in a spatial manner, while the user 100 simultaneously turns their head to the right within the horizontal plane, i.e., x-z plane, causing rotation of the field of view 401 of the user 101 toward the right within the virtual reality scene 400, so as to bring into view displays D2, D3, D4, D5, and D6.

Figure 4H:
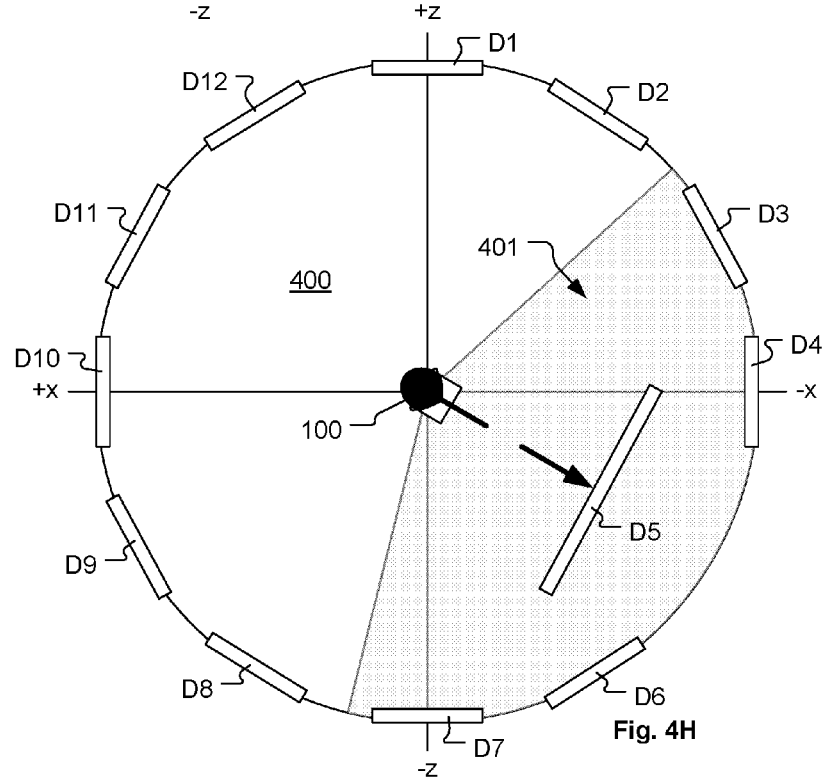
FIG. 4H shows the top view of the user immersed in the virtual reality scene as shown in FIG. 4G, after the user has completed turning of their head to have the field of view substantially centered about the focus direction of the user, in accordance with some embodiments of the present invention.

In the example embodiment of FIG. 4G, because the focus direction 403 of the user 100 remains directed toward the display D5 as the user 100 turns their head (and correspondingly rotates the head mounted display 102), the focus direction 403 is decoupled from its centered relationship with the field of view 401 as the field of view 401 rotates toward the right within the virtual reality scene 400. FIG. 4H shows the top view of the user 100 immersed in the virtual reality scene 400 as shown in FIG. 4G, after the user 100 has completed turning of their head (and correspondingly completed rotation the head mounted display 102) to have the field of view 401 substantially centered about the focus direction 403 of the user 100, in accordance with some embodiments of the present invention. As shown in FIG. 4H, the display D3 has returned to its normal position and the display D5 has moved further toward the user 100.

In some embodiments, once a central region of the field of view 401 of the user 100 has been realigned with the focus direction 403 of the user, such as depicted in FIG. 4H, the focus direction 403 of the user 100 is again synchronized with the central region of the field of view 401 of the user 100. In this manner, if the user 100 turns their head (and correspondingly rotates the head mounted display 102) as a next action, the focus direction 403 will move with the field of view 401 of the user 100 such that the focus direction 403 remains substantially aligned with the central region of the field of view 401 of the user 100. However, in some embodiments, even though the focus direction 403 of the user 100 is again synchronized with the central region of the field of view 401 of the user 100, if the detected eye gaze direction of the user 100 deviates from the focus direction 403, the detected eye gaze direction of the user 100 can become the focus direction 403 of the user, such as previously discussed with regard to FIG. 4F.

Figure 5A:
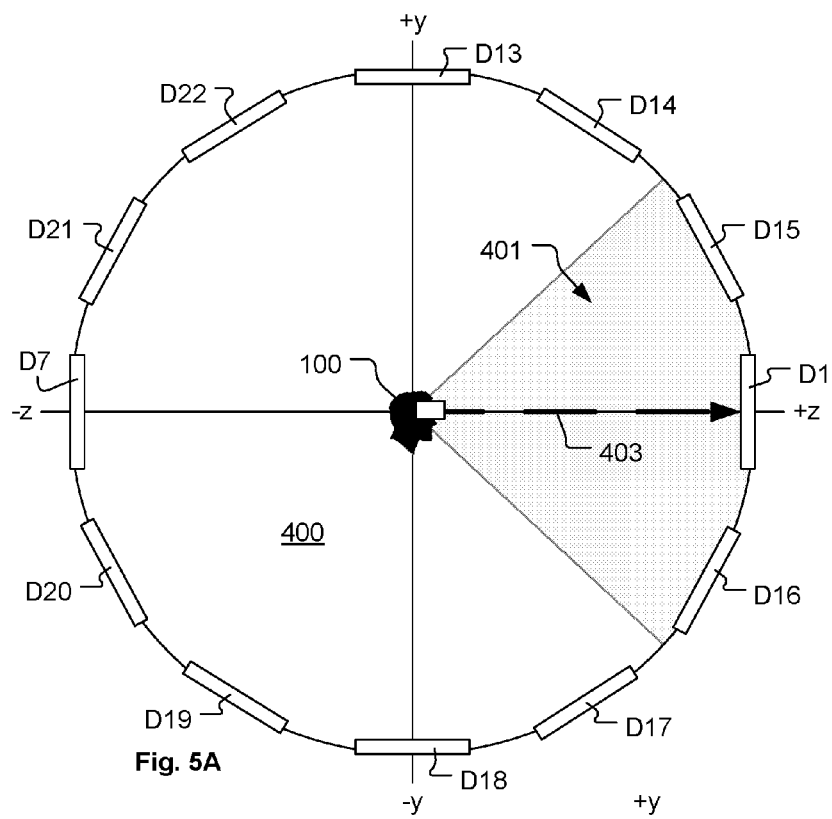
FIG. 5A shows a side view of the user immersed in the virtual reality scene as shown in FIG. 4B, with depiction of the focus direction toward the display D1, in accordance with some embodiments of the present invention.

FIG. 5A shows a side view of the user 100 immersed in the virtual reality scene 400 as shown in FIG. 4B, with depiction of the focus direction 403 toward the display D1, in accordance with some embodiments of the present invention. As shown in FIG. 5A, the field of view 401 of the user 100 has a vertical expanse, i.e., within the y direction, as well as a horizontal expanse, i.e., within the x-z plane. Moreover, it should be understood that within the virtual reality scene 400, the user 100 is immersed in a full three-dimensional virtual environment. Therefore, in some embodiments, multiple displays D1-Dn, where n is any number, can be distributed in essentially any three-dimensional arrangement within the virtual reality scene 400 about the user 100, e.g., at positions in front of the user 100, behind the user 100, above the user 100, below the user 100, to the right of the user 100, to the left of the user 100, and at any location between these referenced positions.

Figure 5B:
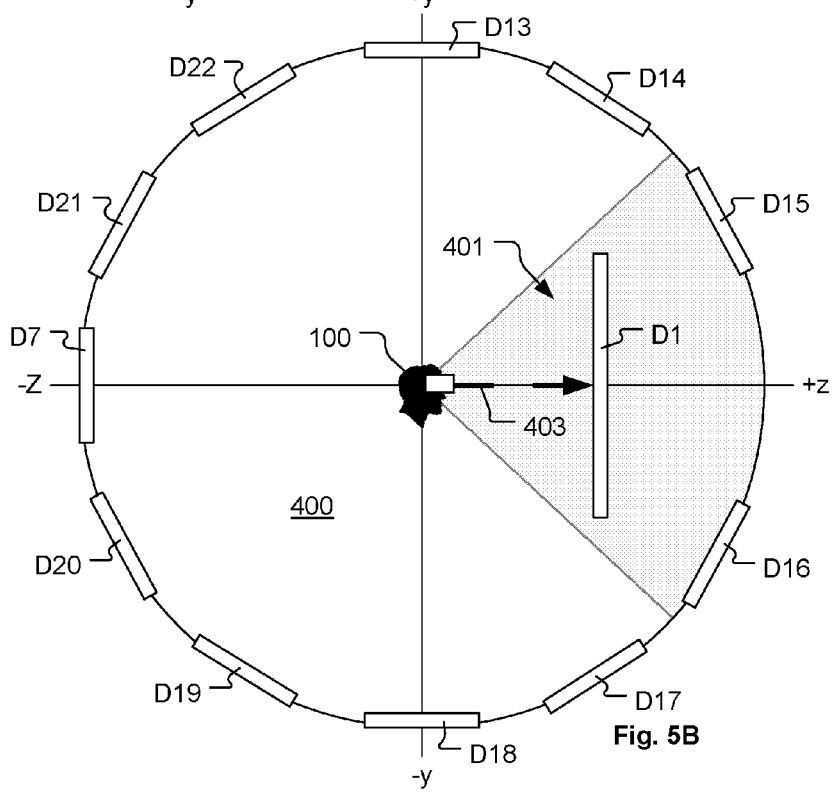
FIG. 5B shows a side view of the user immersed in the virtual reality scene as shown in FIG. 4C, after having determined that the display D1 is the object of current focus of the user, and after the virtual reality scene is adjusted to bring the display D1 toward the user in a spatial manner, in accordance with some embodiments of the present invention.
Figure 5C:
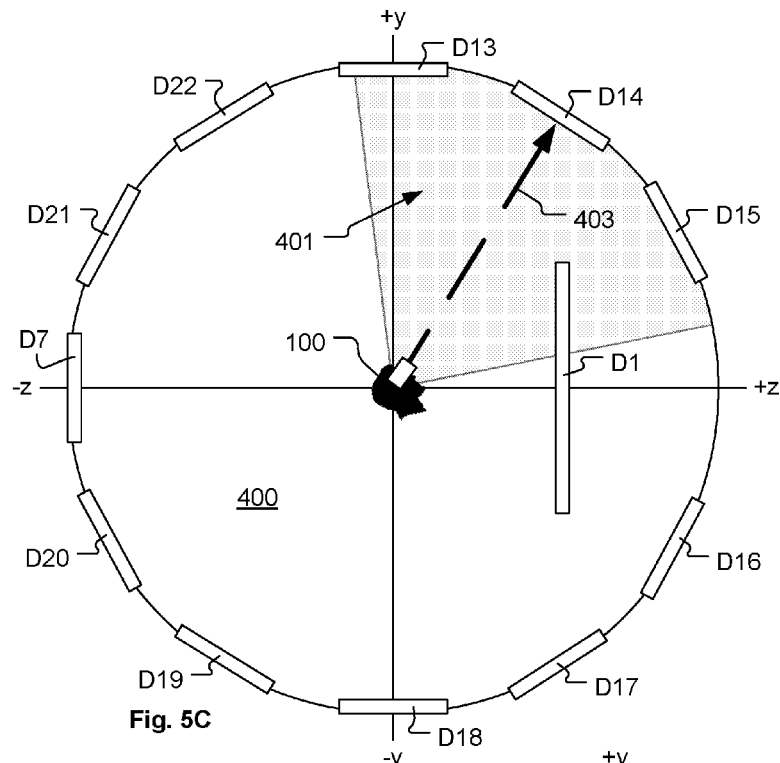
FIG. 5C shows the side view of the user immersed in the virtual reality scene as shown in FIG. 5B, with the user having changed their focus direction, in accordance with some embodiments of the present invention.

FIG. 5B shows a side view of the user 100 immersed in the virtual reality scene 400 as shown in FIG. 4C, after having determined that the display D1 is the object of current focus of the user 100, and after the virtual reality scene 400 is adjusted to bring the display D1 toward the user 100 in a spatial manner, in accordance with some embodiments of the present invention. FIG. 5C shows the side view of the user 100 immersed in the virtual reality scene 400 as shown in FIG. 5B, with the user 100 having changed their focus direction 403, in accordance with some embodiments of the present invention. In the example of FIG. 5C, the user 100 has turned their head upward within the vertical plane, i.e., y-z plane, which has caused a rotation of the field of view 401 of the user 101 upward within the virtual reality scene 400, so as to bring into view displays D13, D14, D15, and D1, and such that the display D14 has become the object of current focus of the user 100.

Figure 5D:
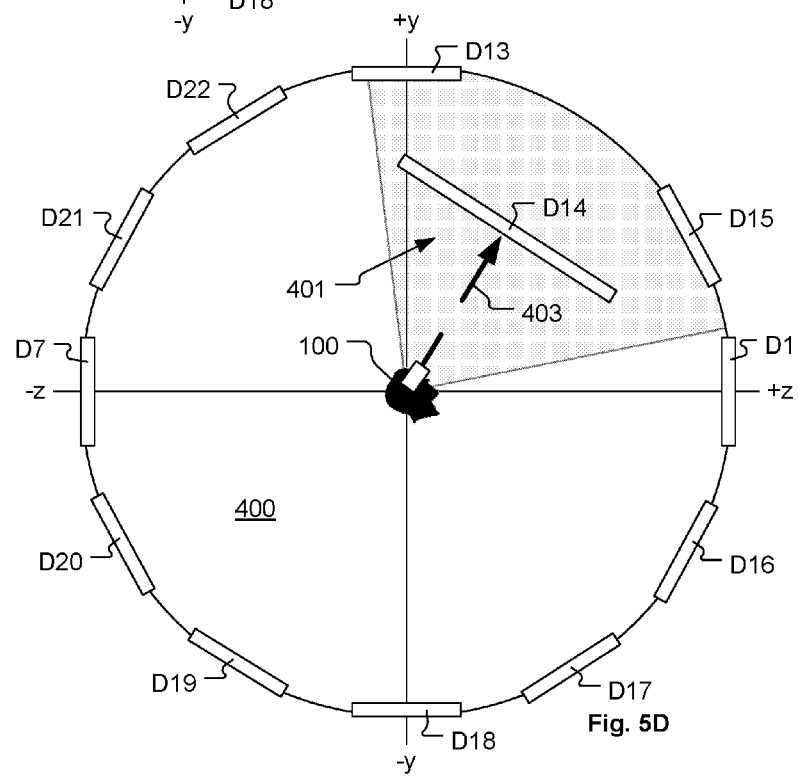
FIG. 5D shows the side view of the user immersed in the virtual reality scene as shown in FIG. 5C, after having determined that the display D14 is the new object of current focus of the user, and after the virtual reality scene is adjusted to diminish the display D1 to its normal position and to bring the display D14 toward the user in a spatial manner, in accordance with some embodiments of the present invention.

Upon determining that the object of current focus of the user 100 has moved from display D1 to display D14, the virtual reality scene 400 changes to diminish the prominence of the display D1 back toward its normal position, while simultaneously bringing the display D14 (the object of current focus of the user 100) toward the user 100 in a spatial manner, such that an enlarged version of the display D14 is positioned prominently in front of the user 100. FIG. 5D shows the side view of the user 100 immersed in the virtual reality scene 400 as shown in FIG. 5C, after having determined that the display D14 is the new object of current focus of the user 100, and after the virtual reality scene 400 is adjusted to diminish the display D1 to its normal position and to bring the display D14 toward the user 100 in a spatial manner, in accordance with some embodiments of the present invention. As previously stated, in some embodiments, when the object of current focus of the user 100 is determined, an audio feed to the user can be modified to include audio content associated with the object of current focus of the user 100. In the example of FIG. 5D, the audio feed to the user 100 can be modified to provide audio content associated with the display D14.

In some embodiments, the virtual reality scene 400 can be temporarily locked to the head mounted display 102, such that the virtual reality scene 400 moves as a whole with the head mounted display 102. For example, in FIG. 5D, it can be determined that the orientation of the head mounted display 102 is requiring the user 100 to maintain as uncomfortable position, e.g., requiring the user 100 to maintain their head in an upward turned direction. When it is determined that the orientation of the head mounted display 102 is requiring the user 100 to maintain an uncomfortable position, in combination with the focus direction 403 of the user 100 remaining substantially fixed upon a given object of current focus of the user 100, the virtual reality scene 400 can be temporarily locked to the head mounted display 102, such that the virtual reality scene 400 moves as a whole with the head mounted display 102. In this manner, once the virtual reality scene 400 is temporarily locked to the head mounted display 102, the user 100 is able to move their head to a more comfortable position (with corresponding movement of the head mounted display 102) while maintaining the focus direction 403 toward the given object of current focus of the user 100, because the virtual reality scene 400 moves as a whole with the head mounted display 102.

In some embodiments, the temporary lock between the virtual reality scene 400 and the head mounted display 102 can be made automatically based on detected conditions. And, in some embodiments, the temporary lock between the virtual reality scene 400 and the head mounted display 102 can be made in accordance with an input signal received from the user 100, where the input signal can be made by the user operating a controller device, or by the user making a physical gesture, or by the user making a series of eye movements (such as a series of rapid blinks), or by the user speaking a voice command, or by any combination thereof.

Additionally, as soon as it is determined that the user 100 has completed their movement to the more comfortable position, the temporary lock between the virtual reality scene 400 and the head mounted display 102 can be released. Once the temporary lock between the virtual reality scene 400 and the head mounted display 102 is released, the field of view 401 of the user 100 will again move within the virtual reality scene 400 in conjunction with movement of the head mounted display 102.

Figure 5E:
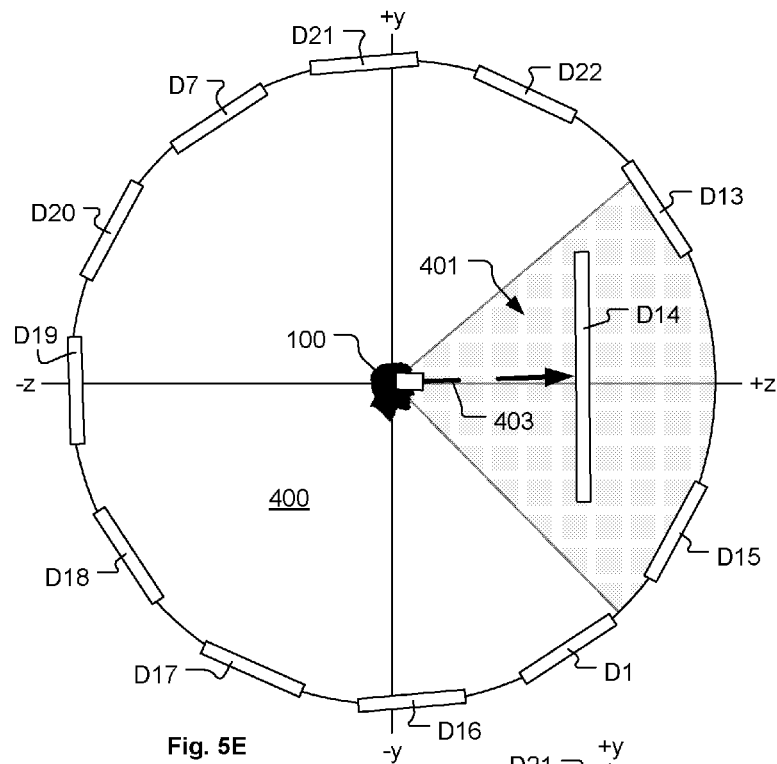
FIG. 5E shows the side view of the user immersed in the virtual reality scene as shown in FIG. 5D, after the virtual reality scene is temporarily locked to the head mounted display, and after the user has moved their head downward to a more comfortable position, in accordance with some embodiments of the present invention.

FIG. 5E shows the side view of the user 100 immersed in the virtual reality scene 400 as shown in FIG. 5D, after the virtual reality scene 400 is temporarily locked to the head mounted display 102, and after the user 100 has moved their head downward to a more comfortable position, in accordance with some embodiments of the present invention. As shown in FIG. 5E, the virtual reality scene 400 as a whole has moved with the head mounted display 102, i.e., has rotated downward in the y-z plane in conjunction with rotation of the head mounted display 102 within the y-z plane, while maintaining the focus direction 403 toward the given object of current focus of the user 100, i.e., toward the display D14.

As soon as it is determined that the user 100 has completed their movement to the more comfortable position, the temporary lock between the virtual reality scene 400 and the head mounted display 102 is released and the field of view 401 of the user 101 again moves within the virtual reality scene 400 in conjunction with movement of the head mounted display 102.

In some embodiments, releasing of the temporary lock between the virtual reality scene 400 and the head mounted display 102 can be done automatically based on detected conditions. And, in some embodiments, releasing of the temporary lock between the virtual reality scene 400 and the head mounted display 102 can be made in accordance with an input signal received from the user 100, where the input signal can be made by the user operating a controller device, or by the user making a physical gesture, or by the user making a series of eye movements (such as a series of rapid blinks), or by the user speaking a voice command, or by any combination thereof.

Figure 5F:
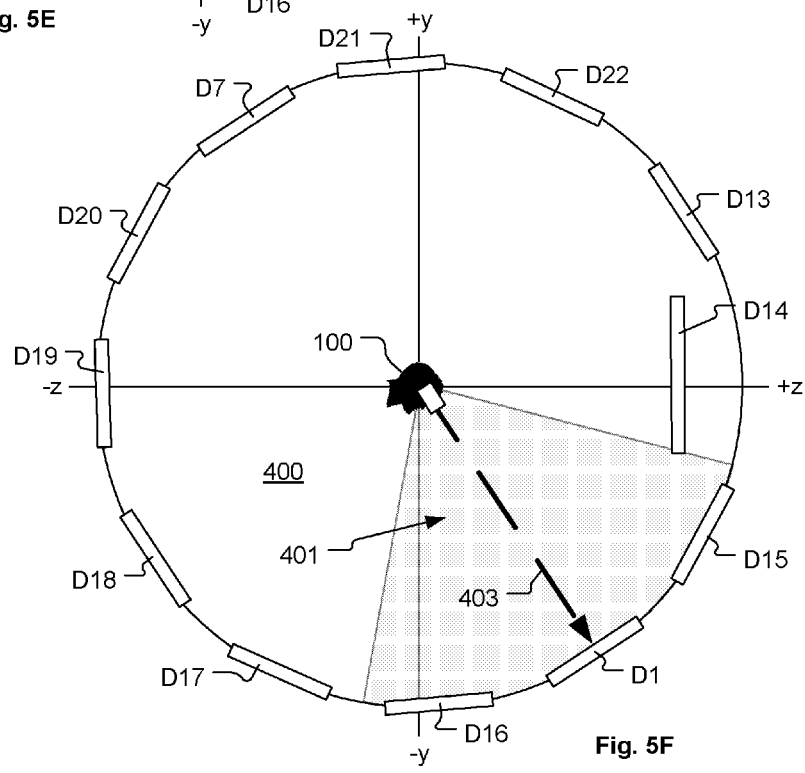
FIG. 5F shows the side view of the user immersed in the virtual reality scene as shown in FIG. 5E, after the temporary lock between the virtual reality scene and the head mounted display is released and after the user has moved their head downward so as to rotate the field of view downward, in accordance with some embodiments of the present invention.

FIG. 5F shows the side view of the user 100 immersed in the virtual reality scene 400 as shown in FIG. 5E, after the temporary lock between the virtual reality scene 400 and the head mounted display 102 is released and after the user has moved their head downward so as to rotate the field of view 401 downward, in accordance with some embodiments of the present invention. In FIG. 5F, the head mounted display 102 has moved to direct the focus direction 403 on display D1 with corresponding movement of the field of view 401. However, it should be noted that the virtual reality scene 400 as a whole has not moved again because the previously applied temporary lock between the virtual reality scene 400 and the head mounted display 102 was released.

FIG. 6A shows an example of the field of view 401 of the user 100 immersed in the virtual reality scene 400 as displayed to the user 100 within the head mounted display 102, in accordance with some embodiments of the present invention. The field of view 401 as shown in FIG. 6A includes displays D31-D45, such that the user 100 can simultaneously see all of displays D31-D45 without having to move around within the virtual reality scene 400. It should be understood that the number and arrangement of displays D31-D45 as shown in FIG. 6A is provided by way of example to facilitate description, and is not limiting. In other embodiments, the virtual reality scene 400 can be defined to have essentially any number, size, shape, and arrangement of displays visible within the field of view 401.

Figure 6B:
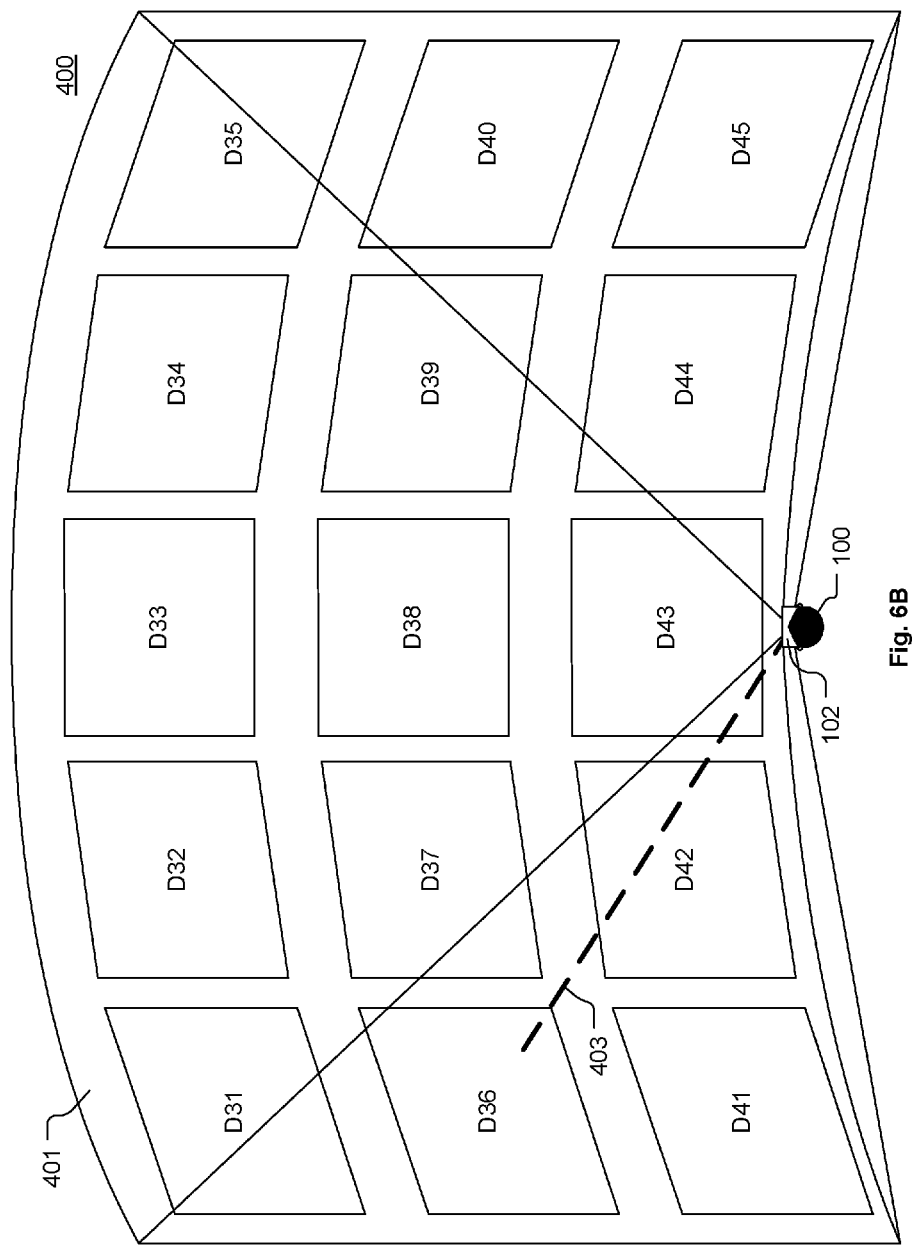
FIG. 6B shows the field of view of the user within the virtual reality scene as shown in FIG. 6A, with the focus direction of the user directed toward display D36, in accordance with some embodiments of the present invention.

FIG. 6B shows the field of view 401 of the user 100 within the virtual reality scene 400 as shown in FIG. 6A, with the focus direction 403 of the user 100 directed toward display D36, in accordance with some embodiments of the present invention. In some embodiments, the focus direction 403 of the user 100 is determined by detecting the eye gaze direction of the user 100 within the head mounted display 102. Also, in some embodiments, identification of the display D36 as the object of current focus of the user 100 can be enabled by an input signal generated by the user, such as by a voice command, a controller action, or essentially any other type of input signal. In some embodiments, the detected eye gaze direction of the user 100 within the head mounted display 102 at the time of generation of the input signal by the user is used to determined the object of current focus of the user 100.

FIG. 6C shows the field of view 401 of the user 100 within the virtual reality scene 400 as shown in FIG. 6B, after having determined that the display D36 is the object of current focus of the user 100, and after the virtual reality scene 400 is adjusted to begin bringing the display D36 toward the user 100 in a spatial manner, in accordance with some embodiments of the present invention. FIG. 6D shows the field of view 401 of the user 100 within the virtual reality scene 400 as shown in FIG. 6C, after further progress in bringing the display D36 toward the user 100 in the spatial manner, in accordance with some embodiments of the present invention. And, FIG. 6E shows the field of view 401 of the user 100 within the virtual reality scene 400 as shown in FIG. 6D, after completion of bringing the display D36 toward the user 100 in the spatial manner, in accordance with some embodiments of the present invention.

In some embodiments, when the object of current focus of the user 100 is determined and as the object of current focus of the user 100 is moved toward the user 100 in the spatial manner, an audio feed to the user can be adjusted to include audio content associated with the object of current focus of the user 100. For example, in the series of FIGS. 6B-6E, if the display D36 has associated audio content, the audio feed to the user 100 can be adjusted to include the audio content associated with the display D36 as the display D36 is moved from its home position, i.e., starting position, to its position of prominence to the user 100 within the field of view 401. Also, in some embodiments, once the object of current focus of the user 100 has been determined and brought forth to its position of prominence to the user 100 within the field of view 401 within the virtual reality scene 400, the user 100 may be allowed to interact with the object of current focus of the user 100.

FIG. 6F shows the field of view 401 of the user 100 within the virtual reality scene 400 as shown in FIG. 6E, after the user 100 has changed the focus direction 403 from the display D36 to the display D35, in accordance with some embodiments of the present invention. Once the focus direction 403 is directed to the display D35, the display D35 becomes the object of current focus of the user 100. In some embodiments, the change in the focus direction 403 is detected by monitoring the eye gaze direction of the user 100 within the head mounted display 102. And, in some embodiments, an input signal generated by the user 100 is used in combination with the detected eye gaze direction 403 to determine the object of current focus of the user 100 within the virtual reality scene 400. Also, once the focus direction 403 is directed to the display D35, the audio feed to the user 100 can be adjusted to include audio content associated with the display D35. Providing the user 100 with audio content associated with the object of current focus of the user 100 can be done either automatically upon detecting the change in the focus direction 403 toward the object of current focus of the user 100 or can be done in response to an input signal generated by the user 100, such as a voice command, controller action, or physical gesture.

Figure 6G:
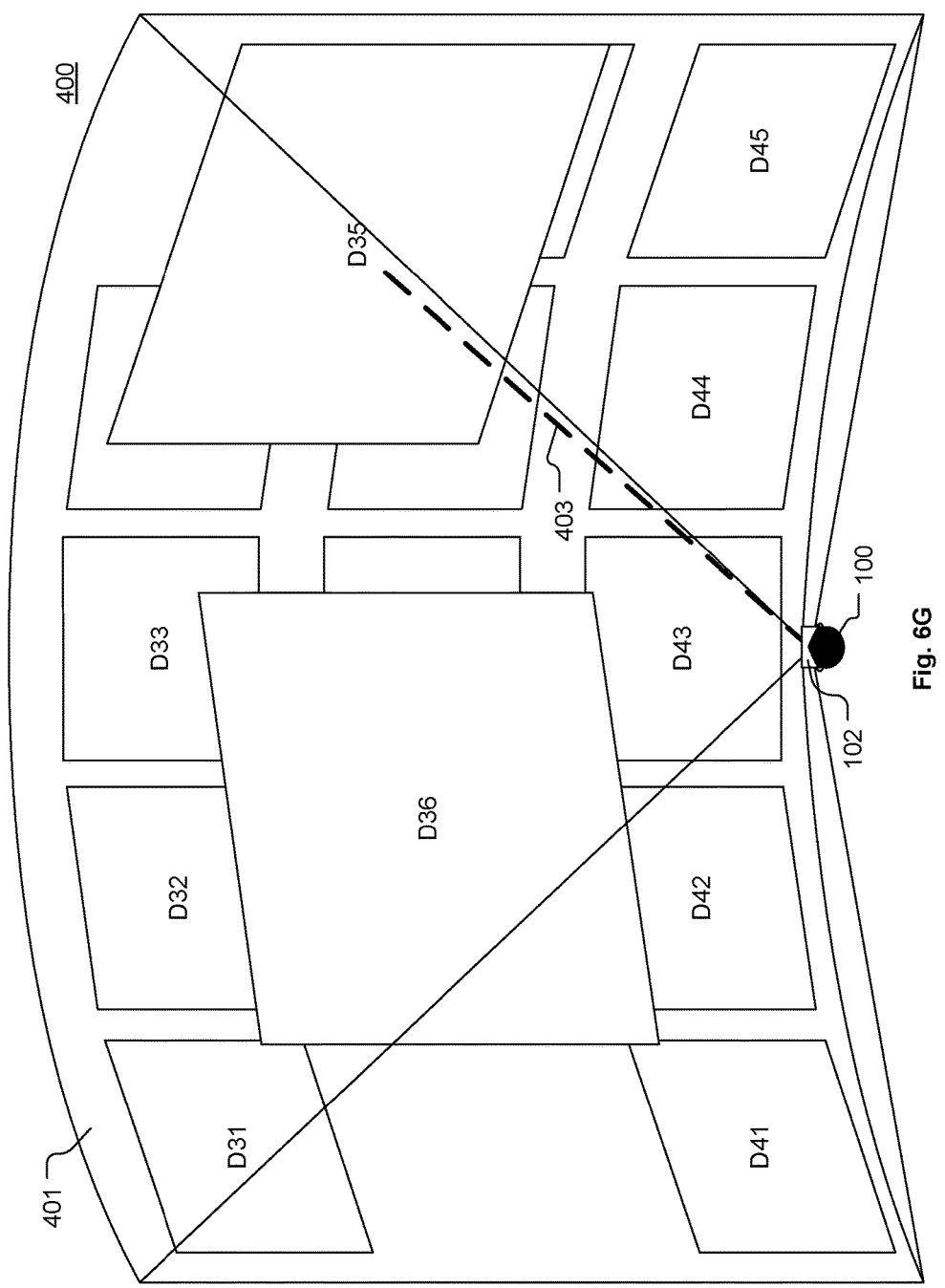
FIG. 6G shows the field of view of the user within the virtual reality scene as shown in FIG. 6F, after having determined that the display D35 is the new object of current focus of the user, in accordance with some embodiments of the present invention.

FIG. 6G shows the field of view 401 of the user 100 within the virtual reality scene 400 as shown in FIG. 6F, after having determined that the display D35 is the new object of current focus of the user 100, in accordance with some embodiments of the present invention. FIG. 6G shows the virtual reality scene 400 adjusting to diminish the display D36 back to its normal position and to bring the display D35 toward the user 100 in a spatial manner, in accordance with some embodiments of the present invention. FIG. 6H shows the field of view 401 of the user 100 within the virtual reality scene 400 as shown in FIG. 6G, after completion of bringing the display D35 toward the user 100 in the spatial manner, in accordance with some embodiments of the present invention.

In some embodiments, the object of current focus of the user 100 can obscure other objects within the virtual reality scene 400, particularly after the object of current focus of the user 100 has been moved toward the user 100. In some embodiments, the user 100 is provided with a transparency control for making the object of current focus of the user 100 become transparent, such that other objects behind the object of current focus of the user 100 become visible, and such that the focus direction 403 of the user can be directed toward one or more of the other objects behind the object of current focus of the user 100. In some embodiments, the transparency control can be activated by the user operating a controller device, or by the user making a physical gesture, or by the user making a series of eye movements (such as a series of rapid blinks), or by the user speaking a voice command, or by any combination thereof.

FIG. 6I shows the field of view 401 of the user 100 within the virtual reality scene 400 as shown in FIG. 6H, after the user 100 has activated the transparency control so as to make the object of current focus of the user 100, i.e., display D35, transparent, in accordance with some embodiments of the present invention. By making the display D35 transparent, the user 100 is able to see the displays D32, D33, D34, D37, D38, D39, D42, D43, and D44 which were previously obscured (at least partially) by the display D35. With the display D35 made transparent by the user 100 activating the transparency control, the user 100 is able to direct their focus direction 403 toward the display D39. In some embodiments, the focus direction 403 of the user 100 can be determined by detecting the eye gaze direction of the user 100 within the head mounted display 102, or by processing an input signal generated by the user (such as a voice command, a controller action, or essentially any other type of input signal), or by any combination thereof.

FIG. 6J shows the field of view 401 of the user 100 within the virtual reality scene 400 as shown in FIG. 6I, after having determined that the display D39 is the new object of current focus of the user 100, with the virtual reality scene 400 adjusting to diminish the display D35 back to its normal position and to bring the display D39 toward the user 100 in a spatial manner, in accordance with some embodiments of the present invention. Again, once the display D39 is determined to be the object of current focus of the user 100, the audio content associated with the display D39 can be included in an audio feed provided to the user 100. And, inclusion of the audio content associated with display D39 within the audio feed provided to the user 100 can be done at the discretion/direction of the user 100. FIG. 6K shows the field of view 401 of the user 100 within the virtual reality scene 400 as shown in FIG. 6J, after completion of bringing the display D39 toward the user 100 in the spatial manner, in accordance with some embodiments of the present invention.

In some embodiments, the focus direction 403 of the user 100 can be simultaneously directed toward multiple objects within the virtual reality scene 400, so as to allow each of the multiple objects to be made objects of current focus of the user 100 in a simultaneous manner. And, audio content associated with each of the multiple objects of current focus of the user 100 can be simultaneously included in an audio feed provided to the user 100, at the discretion/direction of the user 100. For example, FIG. 6L shows an example of the field of view 401 of the user 100 immersed in the virtual reality scene 400 as displayed to the user 100 within the head mounted display 102, in which multiple focus directions 403A, 403B, 403C are simultaneously directed toward multiple objects, i.e., displays D32, D33, D34, respectively, within the virtual reality scene 400, in accordance with some embodiments of the present invention.

In some embodiments, the multiple focus directions 403A, 403B, 403C of the user 100 are determined by detecting the eye gaze direction of the user 100 within the head mounted display 102, or by processing an input signal generated by the user (such as a voice command, a controller action, or essentially any other type of input signal), or by any combination thereof. For example, in some embodiments, the user provides a multiple object selection input signal (by one or more of voice command, physical gesture, eye gesture, controller input, or any combination thereof) indicating that multiple objects are to be selected as objects of current focus of the user 100. And, in conjunction with (or following) provision of the multiple object selection input signal by the user 100, the user 100 provides further input (by one or more of voice command, physical gesture, eye gesture, controller input, or any combination thereof) to indicate which objects are to be selected as objects of current focus of the user 100.

Figure 6L:
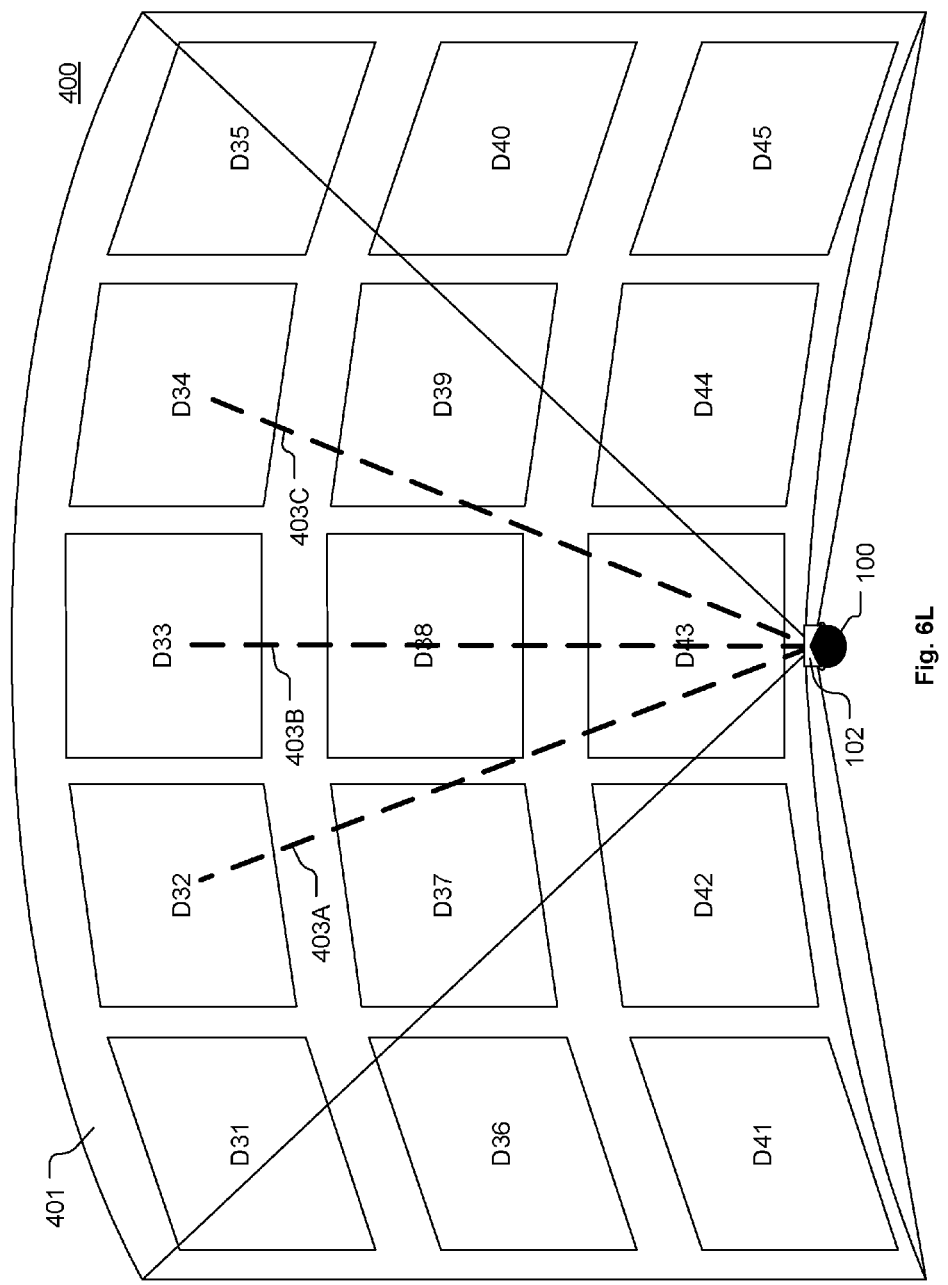
FIG. 6L shows an example of the field of view of the user immersed in the virtual reality scene as displayed to the user within the head mounted display, in which multiple focus directions are simultaneously directed toward multiple objects within the virtual reality scene, in accordance with some embodiments of the present invention.
Figure 6M:
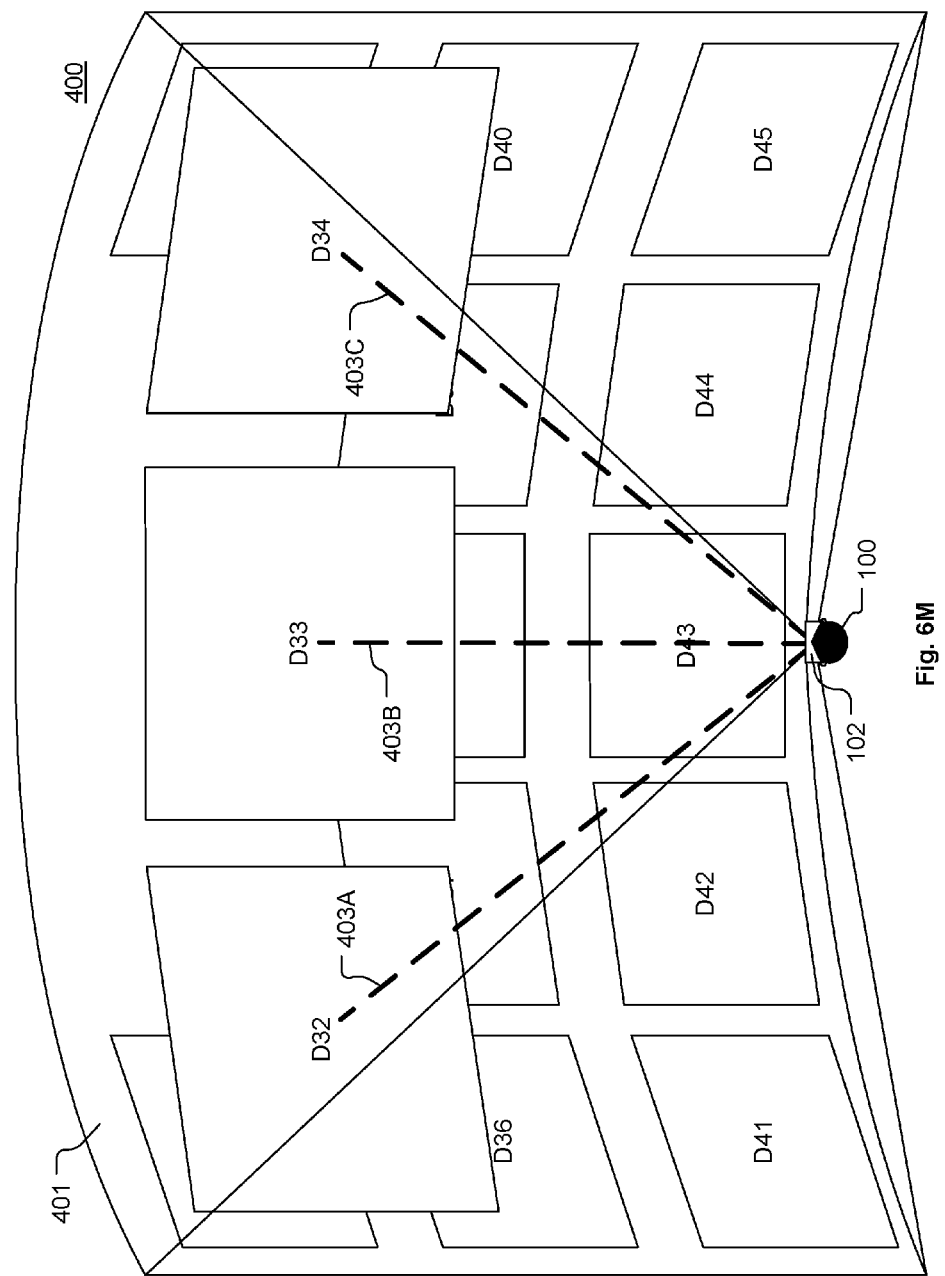
FIG. 6M shows the field of view of the user within the virtual reality scene as shown in FIG. 6L, after having determined that the multiple displays D32, D33, and D34 are the objects of current focus of the user, and after the virtual reality scene is adjusted to begin bringing the multiple displays D32, D33, and D34 toward the user in a spatial manner, in accordance with some embodiments of the present invention.

FIG. 6M shows the field of view 401 of the user 100 within the virtual reality scene 400 as shown in FIG. 6L, after having determined that the multiple displays D32, D33, and D34 are the objects of current focus of the user 100, and after the virtual reality scene 400 is adjusted to begin bringing the multiple displays D32, D33, and D34 toward the user 100 in a spatial manner, in accordance with some embodiments of the present invention. Upon determination that the multiple displays D32, D33, and D34 are the objects of current focus of the user 100, audio content associated with any one or more of the multiple displays D32, D33, and D34 can be included in an audio feed provided to the user 100, either automatically or upon selection by the user 100. Additionally, in some embodiments, selection of multiple objects with the virtual reality scene 400 as objects of current focus of the user 100 does not require the multiple objects for selection to be closely positioned with respect to each other. The multiple objects for selection can be positioned anywhere within the field of view 401 of the user 100.

Figure 6N:
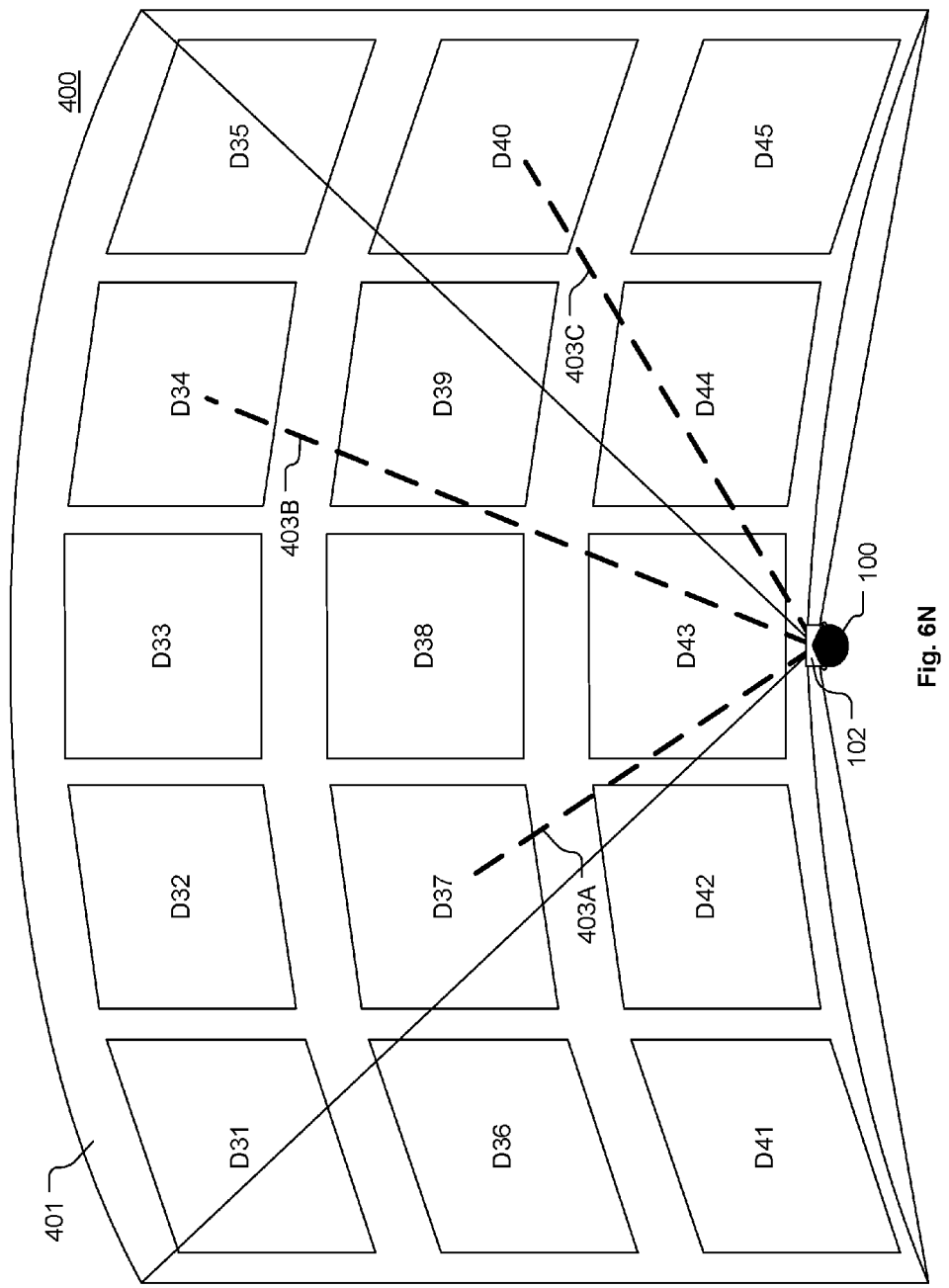
FIG. 6N shows an example of the field of view of the user immersed in the virtual reality scene as displayed to the user within the head mounted display, in which multiple focus directions are simultaneously directed toward multiple spatially separated objects within the virtual reality scene, in accordance with some embodiments of the present invention.
Figure 6O:
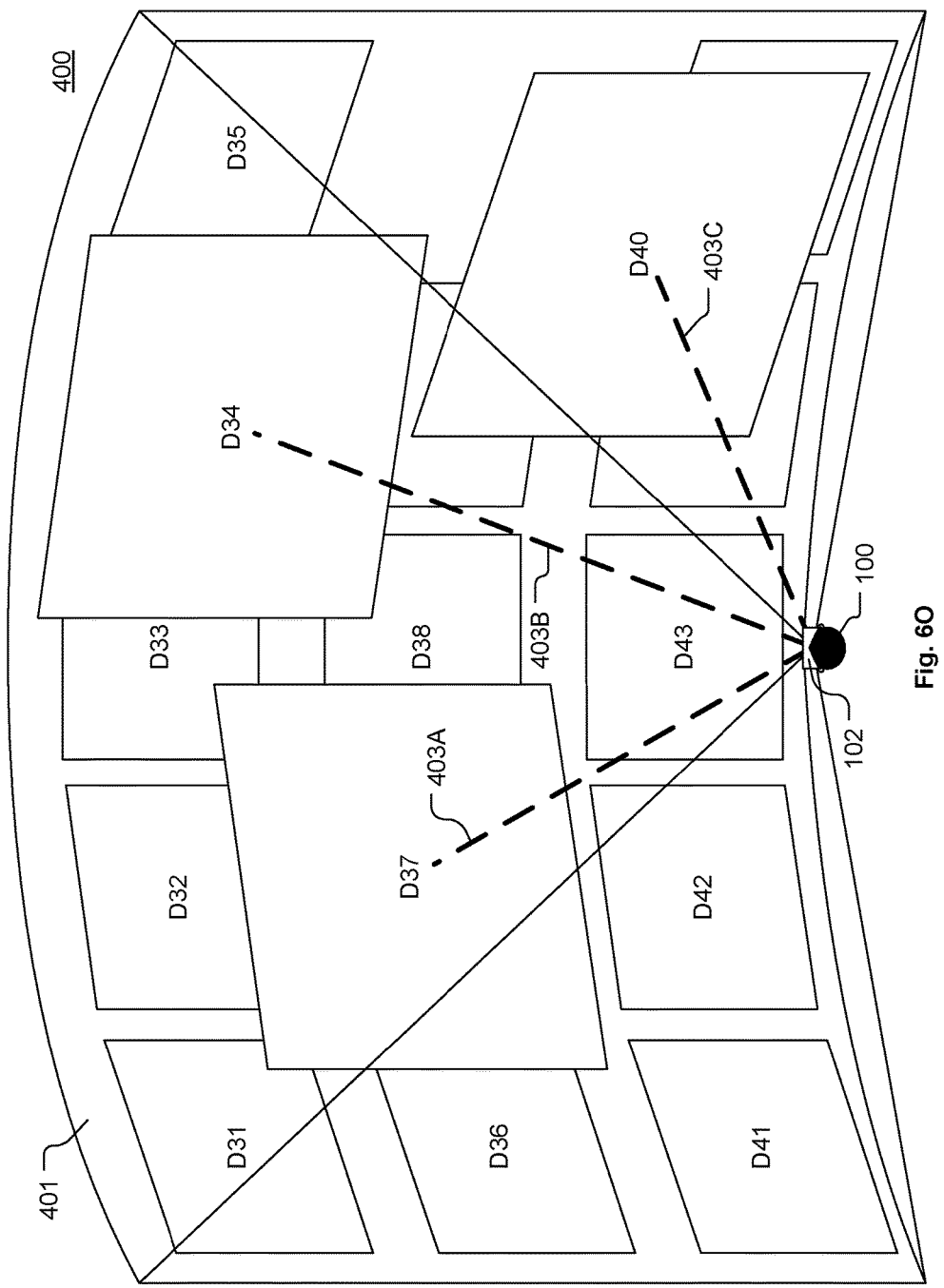
FIG. 6O shows the field of view of the user within the virtual reality scene as shown in FIG. 6N, after having determined that the multiple displays D37, D34, and D40 are the objects of current focus of the user, and after the virtual reality scene is adjusted to begin bringing the multiple displays D37, D34, and D40 toward the user in a spatial manner, in accordance with some embodiments of the present invention.

For example, FIG. 6N shows an example of the field of view 401 of the user 100 immersed in the virtual reality scene 400 as displayed to the user 100 within the head mounted display 102, in which multiple focus directions 403A, 403B, 403C are simultaneously directed toward multiple spatially separated objects, i.e., toward displays D37, D34, D40, respectively, within the virtual reality scene 400, in accordance with some embodiments of the present invention. And, FIG. 6O shows the field of view 401 of the user 100 within the virtual reality scene 400 as shown in FIG. 6N, after having determined that the multiple displays D37, D34, and D40 are the objects of current focus of the user 100, and after the virtual reality scene 400 is adjusted to begin bringing the multiple displays D37, D34, and D40 toward the user 100 in a spatial manner, in accordance with some embodiments of the present invention.

In some embodiments, when an object of current focus of the user 100 is brought toward the user 100 in a spatial manner, the object of current focus of the user 100 can be enlarged to substantially fill the field of view 401 of the user 100. For example, with reference back to FIG. 6E, in some embodiments, the display D36 (i.e., the object of current focus of the user 100 in this example) can be enlarged to substantially fill the field of view 401 of the user 100. In some embodiments, enlarging the object of current focus of the user 100 to substantially fill the field of view 401 of the user 100 is done by enlarging the object of current focus of the user 100 to a point at which it becomes the primary content within the field of view 401 of the user. And, in some embodiments, the enlargement of the object of current focus of the user 100 to substantially fill the field of view 401 of the user 100 can occur in an essentially instantaneous manner upon determining the object of current focus of the user 100. Also, in some embodiments, after the object of current focus of the user 100 has been enlarged to substantially fill the field of view 401 of the user 100, the object of current focus of the user 100 can be returned to is normal size and position upon receiving an input signal from the user 100 directing such action. In various embodiments, the input signal from the user 100 for directing the object of current focus of the user 100 to return to is normal size and position can be essentially any type of input, such as one or more of a voice command from the user, a physical gesture by the user, an eye gesture by the user, a controller input generated by the user, or any combination thereof.

Figure 7:
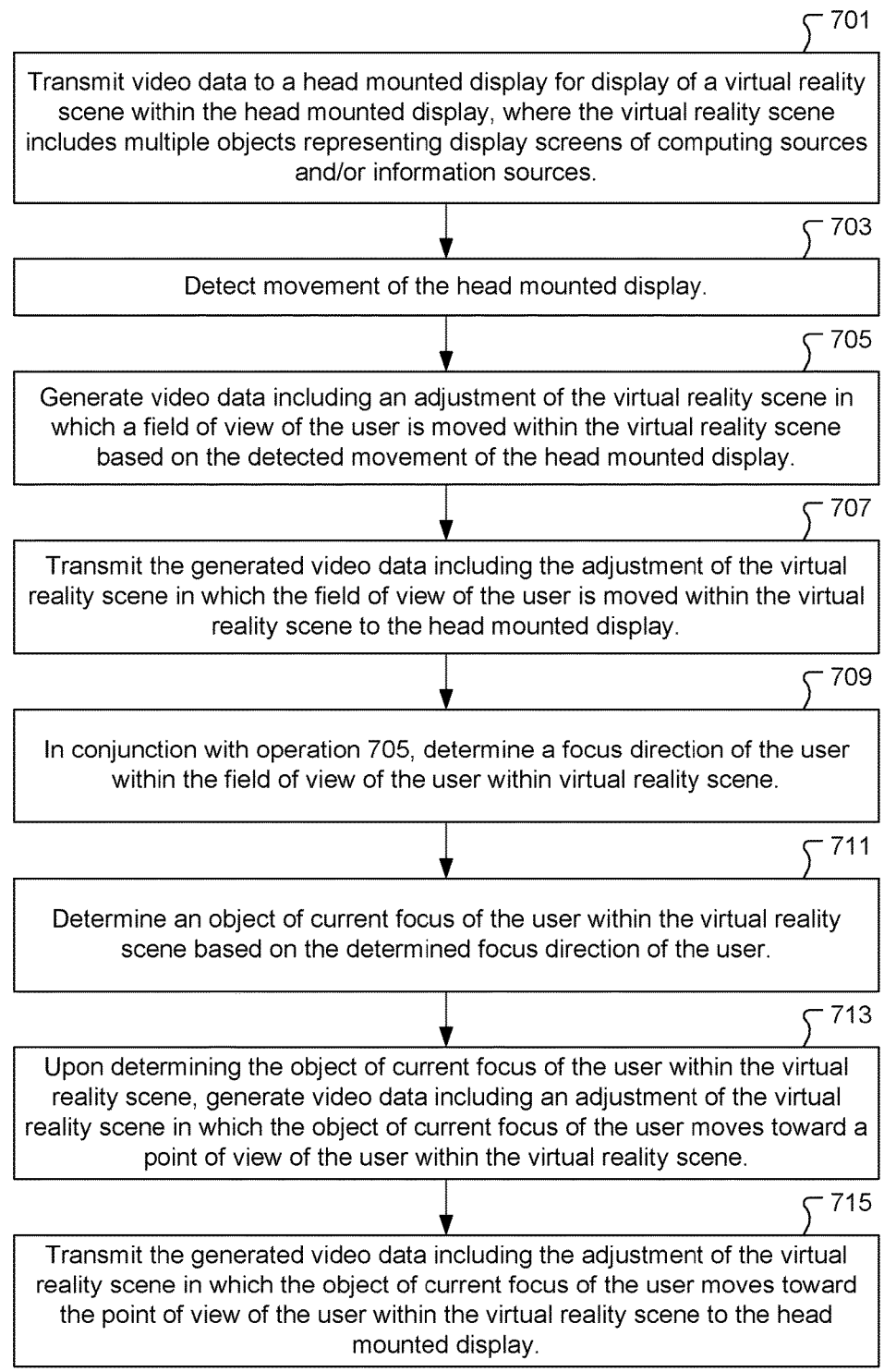
FIG. 7 shows a flowchart of a method for operating a head mounted display, in accordance with some embodiments of the present invention.

FIG. 7 shows a flowchart of a method for operating a head mounted display, in accordance with some embodiments of the present invention. The method includes an operation 701 for transmitting video data to the head mounted display for display of a virtual reality scene within the head mounted display, while the head mounted display is being worn by a user. The virtual reality scene includes multiple objects representing display screens of computing sources or information sources. The method also includes an operation 703 for detecting movement of the head mounted display. The method also includes an operation 705 for generating video data including an adjustment of the virtual reality scene in which a field of view of the user is moved within the virtual reality scene based on the detected movement of the head mounted display. In some embodiments, movement of the field of view of the user within the virtual reality scene based on the detected movement of the head mounted display causes different ones of the multiple objects representing display screens of computing sources or information sources to enter the field of view of the user within the virtual reality scene.

The method also includes an operation 707 for transmitting the generated video data including the adjustment of the virtual reality scene in which the field of view of the user is moved within the virtual reality scene to the head mounted display. The method also includes an operation 709 for determining a focus direction of the user within the field of view of the user within virtual reality scene, in conjunction with operation 705 in which video data is generated including the adjustment of the virtual reality scene in which the field of view of the user is moved. In some embodiments, the focus direction of the user is maintained in a direction toward the central region of the field of view of the user. The method also includes an operation 711 for determining an object of current focus of the user within the virtual reality scene based on the determined focus direction of the user. The focus direction of the user is directed toward the object of current focus of the user. In some embodiments, the object of current focus of the user is one or more of the multiple objects representing display screens of computing sources or information sources. In some embodiments, the method also includes transmitting audio content associated with the object of current focus of the user to the head mounted display, upon determining the object of current focus of the user within the virtual reality scene.

The method also includes an operation 713 for generating video data including an adjustment of the virtual reality scene in which the object of current focus of the user moves toward a point of view of the user within the virtual reality scene, upon determining the object of current focus of the user within the virtual reality scene in operation 711. In some embodiments, the adjustment of the virtual reality scene in operation 713 enlarges the object of current focus of the user to substantially fill the field of view of the user within the virtual reality scene. The method also includes an operation 715 for transmitting the generated video data including the adjustment of the virtual reality scene in which the object of current focus of the user moves toward the point of view of the user within the virtual reality scene to the head mounted display.

In some embodiments, the method also includes detecting a change in an eye gaze direction of the user within the head mounted display. And, upon detecting the change in the eye gaze direction of the user, the method includes changing the focus direction of the user within the field of view of the user within virtual reality scene to align with the eye gaze direction of the user. And, the method includes determining a new object of current focus of the user within the virtual reality scene based on the determined focus direction of the user, where the focus direction of the user is directed toward the new object of current focus of the user. And, upon determining the new object of current focus of the user within the virtual reality scene, the method includes generating video data including an adjustment of the virtual reality scene in which the new object of current focus of the user moves toward the point of view of the user within the virtual reality scene. And, the method includes transmitting the generated video data including the adjustment of the virtual reality scene in which the new object of current focus of the user moves toward the point of view of the user within the virtual reality scene to the head mounted display. Also, in some embodiments, upon determining the new object of current focus of the user within the virtual reality scene, the method includes transmitting audio content associated with the new object of current focus of the user to the head mounted display.

Additionally, in some embodiments, the method includes processing object selection input received from the user, where the object selection input indicates a plurality of the multiple objects representing display screens of computing sources or information sources for simultaneous selection. And, the method includes generating video data including an adjustment of the virtual reality scene in which each of the plurality of the multiple objects moves toward the point of view of the user within the virtual reality scene. And, the method includes transmitting the generated video data including the adjustment of the virtual reality scene in which each of the plurality of the multiple objects moves toward the point of view of the user within the virtual reality scene to the head mounted display. In some embodiments, upon processing the object selection input received from the user, the method includes transmitting audio content associated with each of the plurality of the multiple objects to the head mounted display.

Additionally, in some embodiments, the method includes determining that an orientation of the head mounted display corresponds to a physical contortion of the user having been designated as uncomfortable. And, upon determining that the orientation of the head mounted display corresponds to the physical contortion of the user having been designated as uncomfortable, the method includes locking the virtual reality scene to the head mounted display such that the virtual reality scene moves as a whole with the head mounted display. And, the method includes determining that an orientation of the head mounted display corresponds to a physical contortion of the user having been designated as comfortable. And, upon determining that the orientation of the head mounted display corresponds to the physical contortion of the user having been designated as comfortable, the method includes releasing the locking of the virtual reality scene to the head mounted display such that movement of the head mounted display correlates to movement of the point of view of the user within the virtual reality scene.

Figure 8:
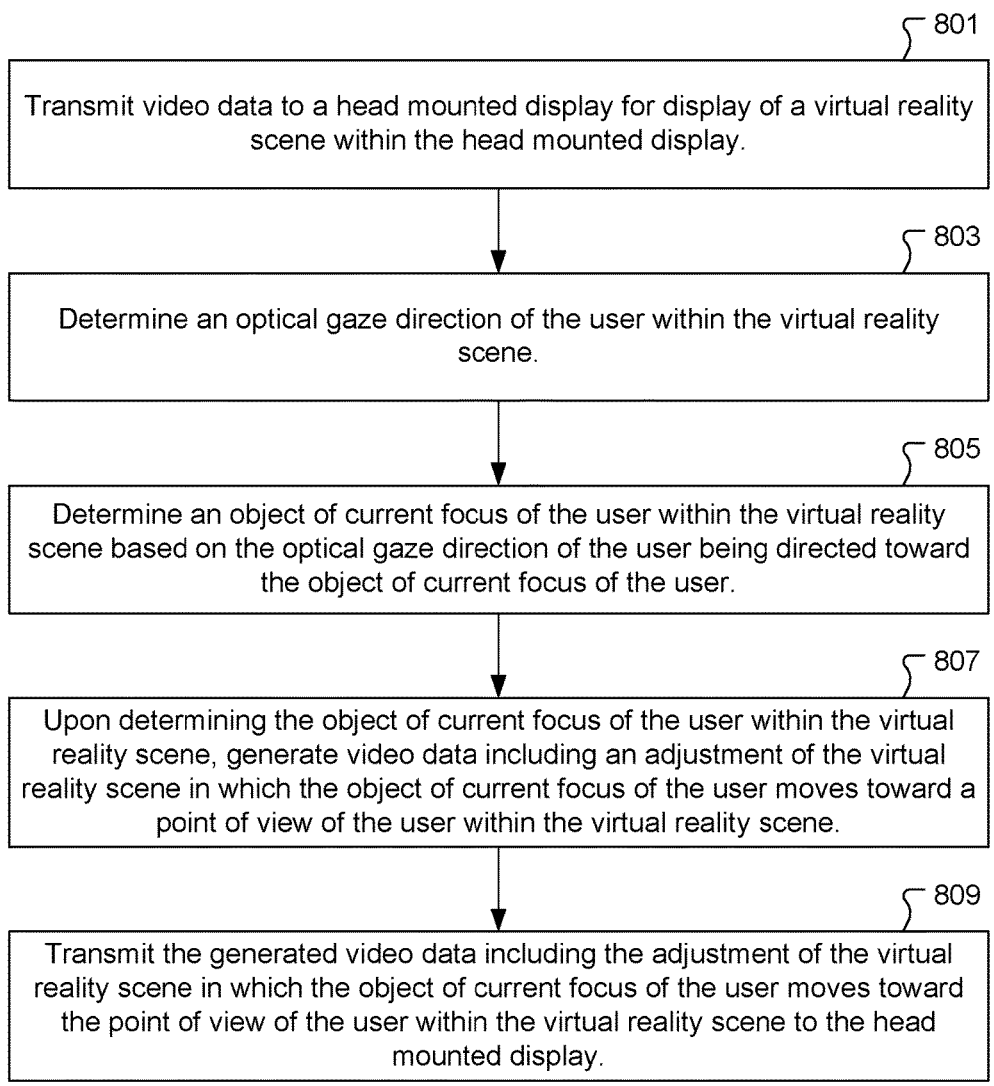
FIG. 8 shows a flowchart of a method for operating a head mounted display, in accordance with some embodiments of the present invention.

FIG. 8 shows a flowchart of a method for operating a head mounted display, in accordance with some embodiments of the present invention. The method includes an operation 801 for transmitting video data to a head mounted display for display of a virtual reality scene within the head mounted display, while the head mounted display is being worn by a user. The method also includes an operation 803 for determining an eye gaze direction of the user within the virtual reality scene. The method also includes an operation 805 for determining an object of current focus of the user within the virtual reality scene based on the eye gaze direction of the user being directed toward the object of current focus of the user. In some embodiments, upon determining the object of current focus of the user within the virtual reality scene, the method includes transmitting audio content associated with the object of current focus of the user to the head mounted display. The method also includes an operation 807 for generating video data including an adjustment of the virtual reality scene in which the object of current focus of the user moves toward a point of view of the user within the virtual reality scene, upon determining the object of current focus of the user within the virtual reality scene. In some embodiments, the adjustment of the virtual reality scene in operation 807 enlarges the object of current focus of the user to substantially fill a field of view of the user within the virtual reality scene. The method also includes an operation 809 for transmitting the generated video data including the adjustment of the virtual reality scene in which the object of current focus of the user moves toward the point of view of the user within the virtual reality scene to the head mounted display.

In some embodiments, the method includes processing a first object selection input received from the user. The first object selection input indicates that the object of current focus of the user is a first object of current focus of the user and is one of a plurality of multiple objects of current focus of the user. And, the method includes determining a new eye gaze direction of the user within the virtual reality scene. And, the method includes determining a second object of current focus of the user within the virtual reality scene based on the new eye gaze direction of the user being directed toward the second object of current focus of the user. And, the method includes processing a second object selection input received from the user. The second object selection input indicating that the second object of current focus of the user is one of the plurality of multiple objects of current focus of the user. And, the method includes generating video data including an adjustment of the virtual reality scene in which each of the plurality of the multiple objects of current focus of the user moves toward the point of view of the user within the virtual reality scene. In some embodiments, the adjustment of the virtual reality scene enlarges the plurality of the multiple objects of current focus of the user in a collective manner to substantially fill a field of view of the user within the virtual reality scene. And, the method includes transmitting the generated video data including the adjustment of the virtual reality scene in which each of the plurality of the multiple objects of current focus of the user moves toward the point of view of the user within the virtual reality scene to the head mounted display.

Additionally in some embodiments, the method includes transmitting audio content associated with the first object of current focus of the user to the head mounted display, upon processing the first object selection input. And, the method includes transmitting audio content associated with the second object of current focus of the user to the head mounted display, upon processing the second object selection input. Also, in some embodiments, each of the first and second object selection inputs is one or more of a voice command from the user, a physical gesture by the user, an eye gesture by the user, a controller input generated by the user, or any combination thereof.

Figure 9:
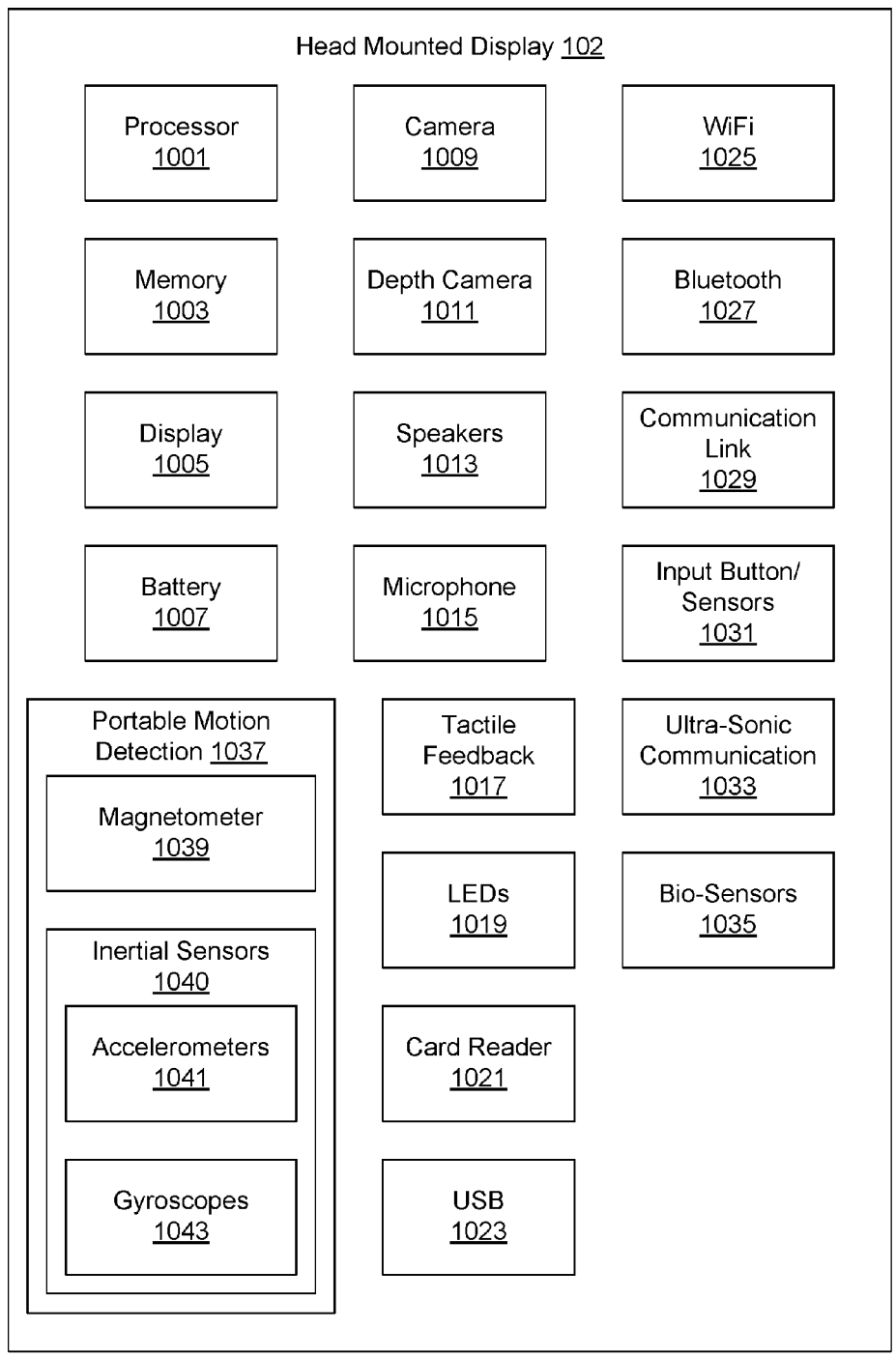
FIG. 9 shows a block-level architecture of the head mounted display, in accordance with an example embodiment of the present invention.

FIG. 9 shows a block-level architecture of the head mounted display 102, in accordance with an example embodiment of the present invention. It should be understood that more or less components can be included or excluded from the head mounted display 102 than what is shown in FIG. 9, depending on the configuration and functions enabled. The head mounted display 102 may include a processor 1001 for executing program instructions. A memory 1003 is provided for data storage purposes, and may include both volatile and non-volatile memory. A display 1005 is included which provides a visual interface that a user may view. The display 1005 can be defined by one single display, or in the form of a separate display screen for each eye. When two display screens are provided, it is possible to provide left-eye and right-eye video content separately. Separate presentation of video content to each eye, for example, can provide for better immersive control of three-dimensional content of the virtual reality scene.

A battery 1007 may be provided as a power source for the head mounted display 102. In other embodiments, the power source can include an outlet connection to power. In other embodiments, an outlet connection to power and a battery 1007 may be provided. In some embodiments, the head mounted display 102 obtains power from the same cable or can connect to another cable. In some embodiments, the head mounted display 102 can have a battery 1007 that is rechargeable, so as to avoid extra power cords.

A motion detection module 1037 may include any of various kinds of motion sensitive hardware, such as a magnetometer 1039, an accelerometer 1041, and a gyroscope 1043. The magnetometer 1039 measures the strength and direction of the magnetic field in the vicinity of the head mounted display 102. In some embodiments, three magnetometers 1039 are used within the head mounted display 102, ensuring an absolute reference for the world-space yaw angle. In some embodiments, the magnetometer 1039 is designed to span the Earth's magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In some embodiments, the accelerometer 1041 is used together with the magnetometer 1039 to obtain the inclination and azimuth of the head mounted display 102.

The accelerometer 1041 is a device for measuring acceleration and gravity induced reaction forces. Single and multiple axis (e.g., six-axis) models are able to detect magnitude and direction of the acceleration in different directions. The accelerometer 1041 is used to sense inclination, vibration, and shock. In one embodiment, three accelerometers 1041 are used to provide the direction of gravity, which gives an absolute reference for two angles (world-space pitch and world-space roll).

The gyroscope 1043 is a device for measuring or maintaining orientation, based on the principles of angular momentum. In one embodiment, three gyroscopes 1043 provide information about movement across the respective coordinate axes (x, y, and z) based on inertial sensing. The gyroscopes 1043 help in detecting fast rotations. However, the gyroscopes 1043 can drift overtime without the existence of an absolute reference. This requires resetting the gyroscopes 1043 periodically, which can be done using other available information, such as positional/orientation determination based on visual tracking of an object, accelerometer, magnetometer, etc.

A camera 1009 is provided for capturing images and image streams of the real-world environment to which the head mounted display 102 is exposed. More than one camera 1009 (optionally) may be included in the head mounted display 102, including a camera 1009 that is rear-facing (directed away from a user when the user is viewing the display of the head mounted display 102), and a camera 1009 that is front-facing (directed towards the user when the user is viewing the display of the head mounted display 102). Additionally, a depth camera 1011 may be included in the head mounted display 102 for sensing depth information of objects in the real-world environment to which the head mounted display 102 is exposed.

The head mounted display 102 includes speakers 1013 for providing audio output. Also, a microphone 1015 may be included for capturing audio from the real-world environment, including sounds from the ambient environment, speech made by the user, etc. The head mounted display 102 includes tactile feedback module 1017 for providing tactile feedback to the user. In one embodiment, the tactile feedback module 1017 is capable of causing movement and/or vibration of the head mounted display 102 so as to provide tactile feedback to the user.

LEDs 1019 are provided as visual indicators of statuses of the head mounted display 102. For example, an LED may indicate battery level, power on, etc. LEDs 1019 can also be used for visual tracking of the position and movement of the head mounted display 102 by a camera viewing the real-world environment in which the head mounted display 102 is located. A card reader 1021 is provided to enable the head mounted display 102 to read and write information to and from a memory card. A USB interface 1023 is included as one example of an interface for enabling connection of peripheral devices, or connection to other devices, such as other portable devices, computers, etc. In various embodiments of the head mounted display 102, any of various kinds of interfaces may be included to enable greater connectivity of the head mounted display 102.

A WiFi module 1025 may be included for enabling connection of the head mounted display 102 to the Internet via wireless networking technologies. Also, the head mounted display 102 may include a Bluetooth module 1027 for enabling wireless connection to other devices. A communications link 1029 may also be included for connection to other devices. In one embodiment, the communications link 1029 utilizes infrared transmission for wireless communication. In other embodiments, the communications link 1029 may utilize any of various wireless or wired transmission protocols for communication with other devices.

Input buttons/sensors 1031 are included to provide an input interface for the user. Any of various kinds of input interfaces may be included, such as buttons, gestures, touchpad, joystick, trackball, etc. An ultra-sonic communication module 1033 may be included in the head mounted display 102 for facilitating communication with other devices via ultra-sonic technologies.

The head mounted display 102 can also include one or more bio-sensors 1035 to enable detection of physiological data from the user wearing the head mounted display 102. In some embodiments, the bio-sensors 1035 include one or more dry electrodes for detecting bio-electric signals of the user through the user's skin, voice detection, eye retina detection to identify users/profiles, etc.

It should be understood that the components of the head mounted display 102 as shown in FIG. 9 are examples of components that may be included in head mounted display 102, and do not represent all possible components that can be included in the head mounted display 102. For example, in various embodiments, the head mounted display 102 may or may not include some of the components shown in FIG. 9. And, in some embodiments, the head mounted display 102 may include additional components not shown in FIG. 9.

Figure 10A:
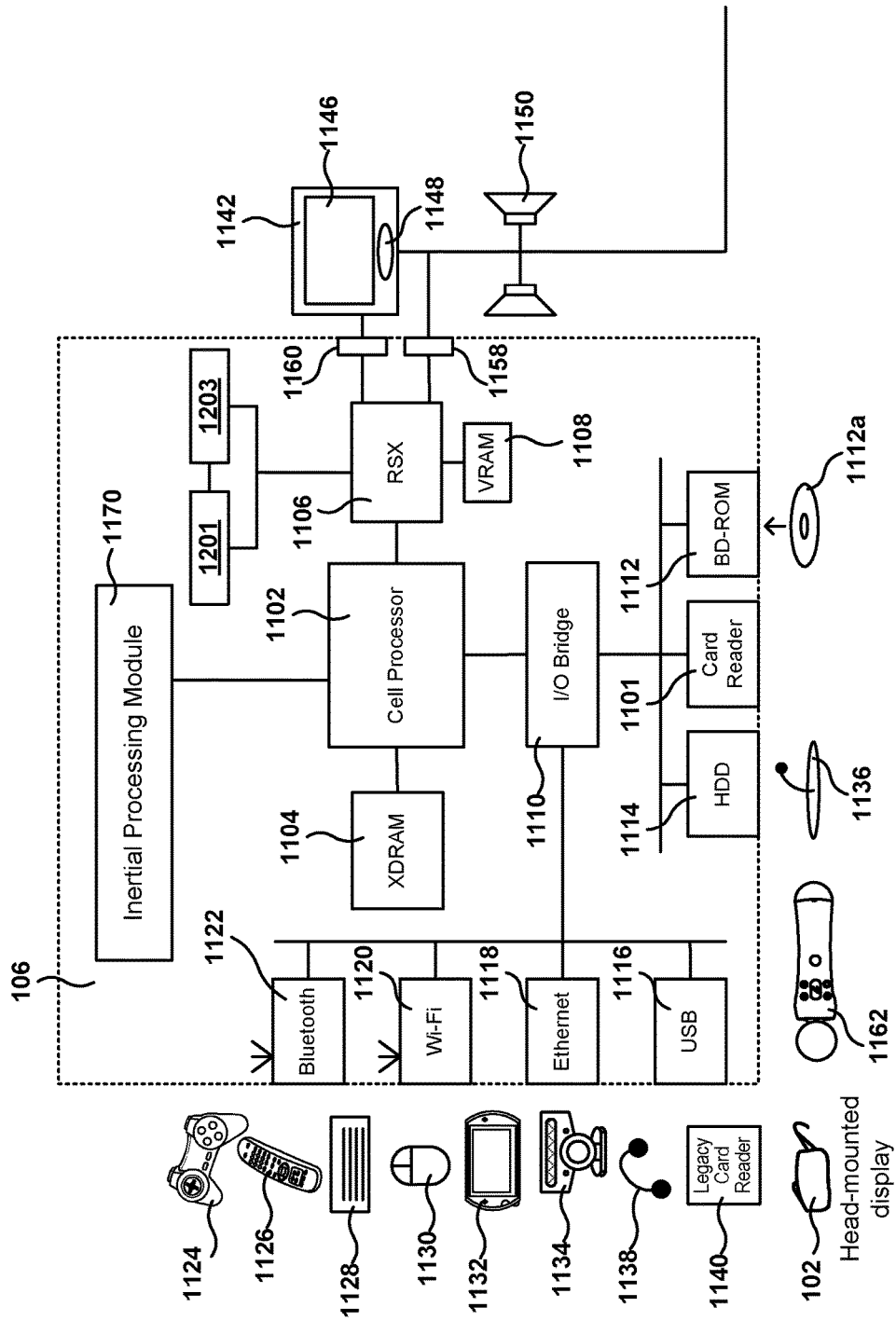
FIG. 10A shows an example block-level architecture of the computer system and other interfacing hardware that may be used to implement some embodiments of the present invention.

FIG. 10A shows an example block-level architecture of the computer system 106 and other interfacing hardware that may be used to implement some embodiments of the present invention. In some embodiments, the computer system 106 may be the Sony® PlayStation® entertainment device. The term PlayStation® as used herein refers to any of the original PlayStation®, the PlayStation 2®, the PlayStation 3®, the PlayStation 4®, or any future version of the PlayStation® gaming system. The computer system 106 can include a cell processor 1102, a Rambus® dynamic random access memory (XDRAM) unit 1104, a reality synthesizer graphics unit 1106 with a dedicated video random access memory (VRAM) unit 1108, and an I/O bridge 1110. The computer system 106 can also include a Blu Ray® Disk BD-ROM® optical disk reader 1112 for reading from a disk 1112a and a removable slot-in hard disk drive (HDD) 1114, accessible through the I/O bridge 1110. Optionally, the computer system 106 also includes a memory card reader 1101 for reading compact flash memory cards, Memory Stick® memory cards and the like, which is similarly accessible through the I/O bridge 1110. The I/O bridge 1110 also connects to six Universal Serial Bus (USB) 2.0 ports 1116, a gigabit Ethernet port 1118, an IEEE 802.11b/g wireless network (Wi-Fi) port 1120, and a Bluetooth® wireless link port 1122 capable of supporting of up to seven Bluetooth connections.

In operation, the I/O bridge 1110 handles all wireless, USB and Ethernet data, including data from one or more game controllers 1162 and 1124. For example, when a user is playing a game, the I/O bridge 1110 receives data from the game controller 1162 and 1124 via a Bluetooth link and directs it to the cell processor 1102, which updates the current state of the game accordingly.

The wireless, USB and Ethernet ports also provide connectivity for other peripheral devices in addition to game controllers 1162 and 1124, such as a remote control 1126, a keyboard 1128, a mouse 1130, a portable entertainment device 1132 such as a Sony PSP® entertainment device, a video camera such as a PlayStation® Eye Camera 1134, a shape object 1136, and a microphone 1138. Such peripheral devices may therefore in principle be connected to the computer system 106 wirelessly. For example, the portable entertainment device 1132 may communicate via a Wi-Fi ad-hoc connection, while the shape object 1136 may communicate via a Bluetooth link.

The provision of these interfaces means that the computer system 106 is also potentially compatible with other peripheral devices such as digital video recorders (DVRs), set-top boxes, digital cameras, portable media players, Voice over Internet Protocol (IP) telephones, mobile telephones, printers and scanners. In addition, a legacy memory card reader 1140 may be connected to the system unit via a USB port 1116, enabling the reading of memory cards of the kind used by the earlier PlayStation devices.

The game controllers 1162 and 1124 are operable to communicate wirelessly with the computer system 106 via the Bluetooth link, or to be connected to a USB port, thereby also providing power by which to charge the battery of the game controllers 1162 and 1124. Game controllers 1162 and 1124 can also include memory, a processor, a memory card reader, permanent memory such as flash memory, light emitters such as an illuminated spherical section, light emitting diodes (LEDs), or infrared lights, microphone and speaker for ultrasound communications, an acoustic chamber, a digital camera, an internal clock, a recognizable shape facing the game console, and wireless communications using protocols such as Bluetooth®, WiFi™, etc. The recognizable shape can be in a shape substantially of a sphere, a cube, parallelogram, a rectangular parallelepiped, a cone, a pyramid, a soccer ball, a football or rugby ball, an imperfect sphere, a section of a sphere, a truncated pyramid, a truncated cone, a baseball bat, a truncated cube, a polyhedron, a star, etc., or a combination of two of more of these shapes.

Game controller 1124 is a controller designed to be used with two hands, and game controller 1162 is a single-hand controller with a ball attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Sony PSP® portable device may be used as a controller. In the case of the Sony PSP® portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1126 is also operable to communicate wirelessly with the computer system 106 via a Bluetooth link. The remote control 1126 includes controls suitable for the operation of the Blu Ray™ Disk BD-ROM reader 1112 and for the navigation of disk content. The Blu Ray™ Disk BD-ROM reader 1112 is operable to read CD-ROMs compatible with any PlayStation devices, in addition to conventional pre-recorded and recordable CDs, and so-called Super Audio CDs. The reader 1112 is also operable to read DVD-ROMs compatible with any Playstation devices, in addition to conventional pre-recorded and recordable DVDs. The reader 1112 is further operable to read BD-ROMs compatible with any PlayStation devices, as well as conventional pre-recorded and recordable Blu-Ray Disks.

The computer system 106 is operable to supply audio and video, either generated or decoded by the PlayStation device via the Reality Synthesizer graphics unit (RSX) 1106, through audio and video connectors to a display and sound output device 1142 such as a monitor or television set having a display 1146 and one or more loudspeakers 1148, or stand-alone speakers 1150. In some embodiments, voice and gaze inputs are utilized to play sound toward specific audio speakers according to the POG of the user. The audio connectors 1158 may include conventional analogue and digital outputs while the video connectors 1160 may variously include component video, S-video, composite video and one or more High Definition Multimedia Interface (HDMI) outputs. Consequently, video output may be in formats such as PAL or NTSC, or in 720p, 1080i or 1080p high definition. Audio processing (generation, decoding and so on) is performed by the cell processor 1302. The PlayStation 3 device's operating system supports Dolby® 5.1 surround sound, Dolby® Theatre Surround (DTS), and the decoding of 7.1 surround sound from Blu-Ray® disks.

In some embodiments, the system 106 includes a focus direction processing module 1201 configured to determine a focus direction of a user within the virtual reality scene displayed within the head mounted display 102. In some embodiments, the focus direction processing module 1201 is configured to determine the focus direction of the user within the virtual reality scene based on movement of the head mounted display 102, or based on eye gaze direction of the user within the virtual reality scene, or based on both movement of the head mounted display 102 and eye gaze direction of the user within the virtual reality scene. Also, the system 106 includes an object-of-focus processing module 1203 configured to determine an object of current focus of the user within the virtual reality scene based on the focus direction determined by the focus direction processing module 1201, where the focus direction of the user is directed toward the object of current focus of the user. The object-of-focus processing module 1203 is configured to direct the rendering engine 1106 to generate an adjustment of the virtual reality scene in which the object of current focus of the user moves toward a point of view of the user within the virtual reality scene. In some embodiments, the adjustment of the virtual reality scene enlarges the object of current focus of the user to substantially fill a field of view of the user within the virtual reality scene. Also, in some embodiments, the object-of-focus processing module 1203 is configured to direct transmission of audio content associated with the object of current focus of the user to the head mounted display 102.

Additionally, in some embodiments, the object-of-focus processing module 1203 is configured to determine a plurality of objects of current focus of the user within the virtual reality scene based on the focus direction determined by the focus direction processing module 1201 and one or more additional inputs received from the user. And, the object-of-focus processing module 1203 is configured to direct the rendering engine 1106 to generate an adjustment of the virtual reality scene in which each of the plurality of objects of current focus of the user moves toward the point of view of the user within the virtual reality scene. Also, in some embodiments, the object-of-focus processing module 1203 is configured to direct transmission of audio content associated with each of the plurality of objects of current focus of the user to the head mounted display.

Figure 10B:
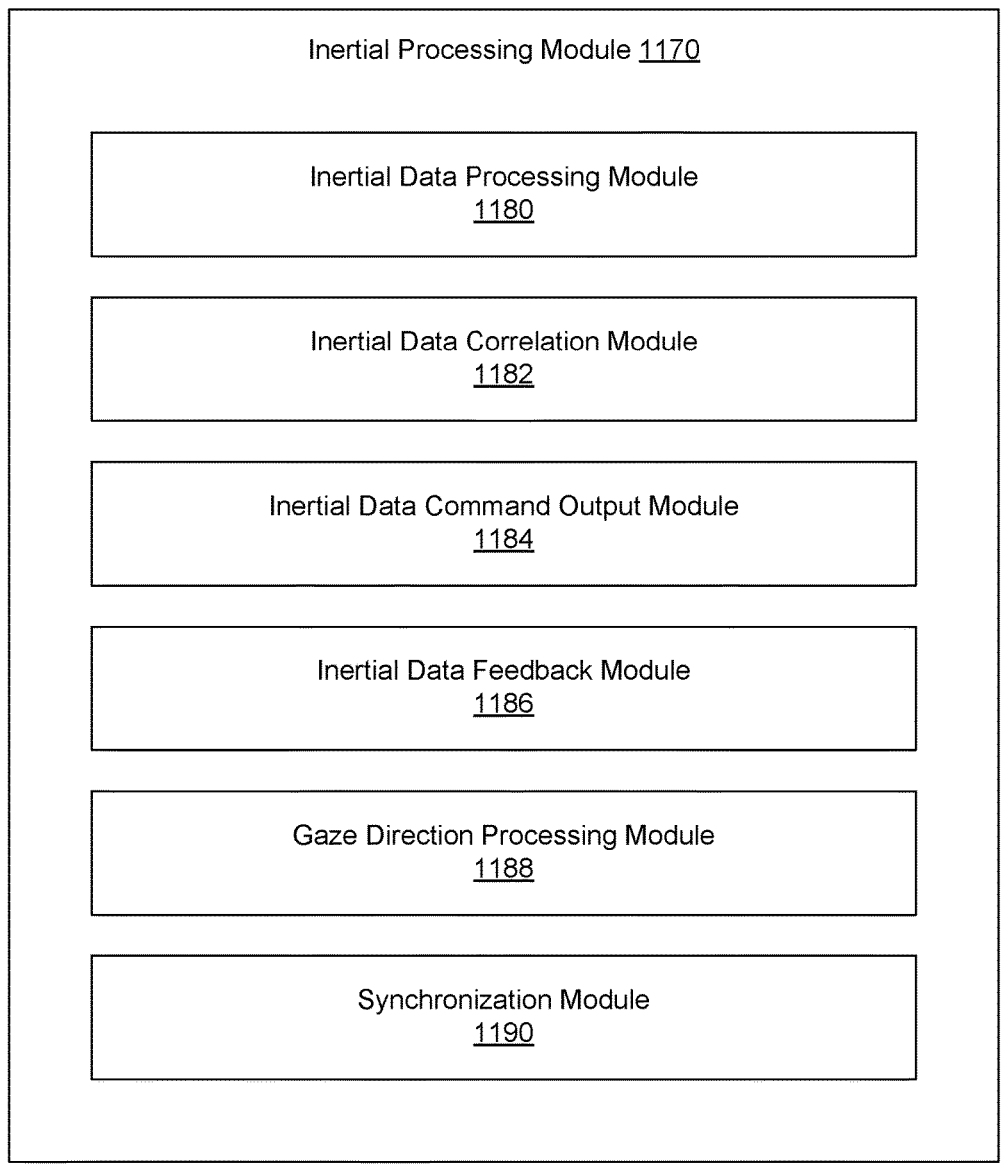
FIG. 10B shows a block-level diagram of the inertial processing module, in accordance with an example embodiment of the present invention.

The computer system 106 also includes an inertial processing module 1170 in communication with the cell processor 1102. The inertial processing module 1170 is connected to receive inertial sensor data from inertial sensors within the head mounted display 102. FIG. 10B shows a block-level diagram of the inertial processing module 1170, in accordance with an example embodiment of the present invention. The inertial processing module 1170 includes an inertial data processing module 1180 configured to receive inertial sensor data from the head mounted display 102. The inertial sensor data indicates movement of the head mounted display 102 in accordance with movement of a user by whom the head mounted display 102 is worn. The movement of the user is based on a virtual reality scene displayed within the head mounted display 102. The inertial data processing module 1180 is configured to determine from the inertial sensor data a route of movement of the head mounted display 102 and a rate of movement of the head mounted display 102. In some embodiments, the route of movement of the head mounted display corresponds to one or more user movements within a set of user movements including a forward lean, a backward lean, a left lean, a right lean, a left head turn, a right head turn, an upward head tilt, a downward head tilt, a squat, and a jump. However, in other embodiments, the route of movement of the head mounted display may correspond to essentially any user movement within the movement capabilities of the human body.

The inertial processing module 1170 also includes an inertial data correlation module 1182 configured to correlate the route of movement of the head mounted display and the rate of movement of the head mounted display to an action within the virtual reality scene currently displayed within the head mounted display 102. In some embodiments, the action within the virtual reality scene is a movement of a viewpoint of the user within the virtual reality scene. In some embodiments, the action within the virtual reality scene is a change in direction of a viewpoint of the user within the virtual reality scene. In some embodiments, the action within the virtual reality scene is a zoom-in or a zoom-out of a viewpoint of the user within the virtual reality scene. In some embodiments, the action within the virtual reality scene is a movement of an object displayed within the virtual reality scene. It should be understood, however, that the action within the virtual reality scene to which the inertial sensor data is correlated can be essentially any type of action commensurate with the current context of the virtual reality scene as displayed to the user within the head mounted display.

The inertial processing module 1170 also includes an inertial data command output module 1184 configured to provide a command signal to a rendering engine, such as the Reality Synthesizer graphics unit (RSX) 1106. The command signal directs the rendering engine to update the virtual reality scene to reflect implementation of the action correlated to the route of movement and rate of movement of the head mounted display 102.

In some embodiments, the inertial data correlation module 1182 is configured to determine a set of allowable virtual movements within a current context of the virtual reality scene. In some embodiments, the inertial data correlation module 1182 is configured to map the route of movement of the head mounted display to a corresponding virtual movement within the set of allowable virtual movements. In some embodiments, the inertial data correlation module 1182 is configured to query a calibration table in order to map the route of movement of the head mounted display to the corresponding virtual movement within the set of allowable virtual movements. In such embodiments, the calibration table defines associations between a number of routes of movement of the head mounted display and resulting actions within the virtual reality scene.

Also, in some embodiments, the inertial data correlation module 1182 is configured to map the rate of movement of the head mounted display to a rate of the corresponding virtual movement within the virtual reality scene. In some embodiments, the inertial data correlation module 1182 is configured to query a calibration table in order to map the route of movement and the rate of movement of the head mounted display to the corresponding virtual movement within the virtual reality scene. In such embodiments, the calibration table defines associations between a number of combinations of routes and rates of movement of the head mounted display and resulting actions within the virtual reality scene.

Also, in some embodiments, the inertial data correlation module 1182 is configured to determine that the route of movement of the head mounted display does not correspond to any virtual movement within the set of allowable virtual movements. In some embodiments, the inertial processing module 1170 includes an inertial data feedback module 1186 configured to generate and transmit a feedback signal to the head mounted display, where the feedback signal notifies the user that the movement of the head mounted display does not correspond to any virtual movement within the set of allowable virtual movements.

In some embodiments, the inertial processing module 1170 includes a gaze direction processing module 1188 configured to receive gaze direction data from the head mounted display. The gaze direction data indicates a vision focus direction of the user upon the virtual reality scene displayed within the head mounted display. The inertial processing module 1170 can also include a synchronization module 1190 configured to synchronize the gaze direction data with the inertial sensor data to determine a synchronized vision focus direction. In some embodiments, the synchronization module 1190 is configured to temporally align the gaze direction data with the inertial sensor data.

When the gaze direction processing module 1188 and synchronization module 1190 are utilized, the inertial data correlation module 1182 can be configured to use both the route of movement of the head mounted display and the synchronized vision focus direction to determine the action within the virtual reality scene. In some embodiments, the inertial data correlation module 1182 is configured to use the synchronized vision focus direction as a directional weighting parameter in determining the action within the virtual reality scene. In some embodiments, a magnitude of the directional weighting parameter is proportional to an amount of time that the synchronized vision focus direction persists in a given direction.

An application programming interface (API) can be made available to provide applications with access to the functions and outputs of the inertial processing module 1170. The API can be used by multiple applications, e.g., games, in a simultaneous manner. It should be understood that the inertial processing module 1170 and/or various modules (1180, 1182, 1184, 1186, 1188, 1190) therein can be implemented as software and/or firmware in various embodiments. Also, in some embodiments, portions of the inertial processing module 1170 and/or various modules (1180, 1182, 1184, 1186, 1188, 1190) therein can be implemented as hardware, such as when rapid data processing is required for application performance.

Although some method operations have been described in a specific order herein, it should be understood that other housekeeping operations may be performed between operations, or operations may be adjusted so that they occur at slightly different times, or may be distributed in a system which allows the occurrence of the processing operations at various intervals associated with the processing. Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the described embodiments.

What is claimed is:

1. A method, comprising:
   transmitting video data to a head mounted display for display of a virtual reality scene within the head mounted display, the head mounted display being worn by a user, the virtual reality scene including multiple objects representing display screens of computing sources or information sources;
   detecting movement of the head mounted display;
   generating video data including an adjustment of the virtual reality scene in which a field of view of the user is moved within the virtual reality scene based on the detected movement of the head mounted display;
   transmitting the generated video data including the adjustment of the virtual reality scene in which the field of view of the user is moved within the virtual reality scene to the head mounted display;
   determining that an orientation of the head mounted display corresponds to a physical contortion of the user having been designated as uncomfortable and in response locking the virtual reality scene to the head mounted display such that the field of view of the user within the virtual reality scene does not change as the head mounted display is moved; and
   releasing the locking of the virtual reality scene to the head mounted display when the head mounted display is moved to another orientation that does not correspond to the physical contortion of the user having been designated as uncomfortable.

2. The method as recited in claim 1, further comprising:
   determining a focus direction of the user within the field of view of the user within the virtual reality scene;
   determining an object of current focus of the user that the focus direction of the user is directed toward within the virtual reality scene, wherein the object of current focus of the user is one or more of the multiple objects representing display screens of computing sources or information sources.

3. The method as recited in claim 1, further comprising:
determining a focus direction of the user within the field of view of the user within the virtual reality scene;
determining an object of current focus of the user that the focus direction of the user is directed toward within the virtual reality scene; and
upon determining the object of current focus of the user within the virtual reality scene, transmitting audio content associated with the object of current focus of the user to the head mounted display.

4. The method as recited in claim 1, further comprising:
determining a focus direction of the user within the field of view of the user within the virtual reality scene, wherein the focus direction of the user is toward an off-center location within the field of view of the user that is away from a center of the field of view of the user; and
generating video data including a further adjustment of the virtual reality scene that moves the field of view of the user within the virtual reality scene to cause the focus direction of the user to move from the off-center location within the field of view of the user to the center of the field of view of the user; and
transmitting the generated video data including the further adjustment of the virtual reality scene to the head mounted display.

5. The method as recited in claim 1, further comprising:
detecting a change in an eye gaze direction of the user within the head mounted display;
using the detected change in the eye gaze direction of the user to determine a focus direction of the user within the field of view of the user within the virtual reality scene;
determining a new object of current focus of the user within the virtual reality scene based on the determined focus direction of the user, wherein the focus direction of the user is directed toward the new object of current focus of the user;
upon determining the new object of current focus of the user within the virtual reality scene, generating video data including a further adjustment of the virtual reality scene in which the new object of current focus of the user moves toward the point of view of the user within the virtual reality scene; and
transmitting the generated video data including the further adjustment of the virtual reality scene to the head mounted display.

6. The method as recited in claim 5, further comprising:
upon determining the new object of current focus of the user within the virtual reality scene, transmitting audio content associated with the new object of current focus of the user to the head mounted display.

7. The method as recited in claim 1, further comprising:
processing object selection input received from the user, the object selection input indicating a plurality of the multiple objects representing display screens of computing sources or information sources for simultaneous selection;
generating video data including a further adjustment of the virtual reality scene in which each of the plurality of the multiple objects moves toward the point of view of the user within the virtual reality scene; and transmitting the generated video data including the further adjustment of the virtual reality scene to the head mounted display.

8. The method as recited in claim 7, further comprising:
upon processing the object selection input received from the user, transmitting audio content associated with each of the plurality of the multiple objects to the head mounted display.

9. The method as recited in claim 1, wherein releasing the locking of the virtual reality scene to the head mounted display causes the field of view of the user within the virtual reality scene to move based on detected movement of the head mounted display.

10. The method as recited in claim 1, wherein movement of the field of view of the user within the virtual reality scene based on the detected movement of the head mounted display causes different ones of the multiple objects representing display screens of computing sources or information sources to enter the field of view of the user within the virtual reality scene.

11. A method, comprising:
transmitting video data to a head mounted display for display of a virtual reality scene within the head mounted display, the head mounted display being worn by a user;
determining an eye gaze direction of the user within the virtual reality scene;
determining an object of current focus of the user within the virtual reality scene based on the eye gaze direction of the user being directed toward the object of current focus of the user;
upon determining the object of current focus of the user within the virtual reality scene, generating video data including an adjustment of the virtual reality scene in which the object of current focus of the user moves toward a point of view of the user within the virtual reality scene, wherein the adjustment of the virtual reality scene enlarges the object of current focus of the user within a field of view of the user within the virtual reality scene;
transmitting the generated video data including the adjustment of the virtual reality scene to the head mounted display;
upon receiving a signal indicating activation of a transparency control, generating video data including a further adjustment of the virtual reality scene in which the object of current focus of the user is made transparent to reveal other selectable objects within the virtual reality scene behind the object of current focus of the user and to enable selection of the other selectable objects behind the object of current focus of the user visible in transparent form; and
transmitting the generated video data including the further adjustment of the virtual reality scene to the head mounted display.

12. The method as recited in claim 11, further comprising:
upon determining the object of current focus of the user within the virtual reality scene, transmitting audio content associated with the object of current focus of the user to the head mounted display.

13. The method as recited in claim 11, further comprising:
processing a first object selection input received from the user, the first object selection input indicating that the object of current focus of the user is a first selected object;
determining a new eye gaze direction of the user within the virtual reality scene;

determining a second object of current focus of the user within the virtual reality scene based on the new eye gaze direction of the user being directed toward the second object of current focus of the user, wherein the second object of current focus of the user is one of the other selectable objects behind the object of current focus of the user visible in transparent form;

processing a second object selection input received from the user, the second object selection input indicating that the second object of current focus of the user is a second selected object;

generating video data including an adjustment of the virtual reality scene in which each of the first and second selected objects moves toward the point of view of the user within the virtual reality scene; and transmitting the generated video data including the adjustment of the virtual reality scene in which each of the first and second selected objects moves toward the point of view of the user within the virtual reality scene to the head mounted display.

14. The method as recited in claim 13, wherein the adjustment of the virtual reality scene enlarges the first and second selected objects in a collective manner to substantially fill a field of view of the user within the virtual reality scene.

15. The method as recited in claim 13, further comprising:
upon processing the first object selection input, transmitting audio content associated with the first selected object to the head mounted display; and
upon processing the second object selection input, transmitting audio content associated with the second selected object to the head mounted display.

16. The method as recited in claim 13, wherein each of the first and second object selection inputs is one or more of a voice command from the user, a physical gesture by the user, an eye gesture by the user, a controller input generated by the user, or any combination thereof.

17. A system, comprising:
a rendering engine for generating video data of a virtual reality scene for display within a head mounted display;
a computer system operable to determine a focus direction of a user within the virtual reality scene displayed within the head mounted display,
the computer system operable to determine an object of current focus of the user within the virtual reality scene based on the focus direction of the user,
the computer system operable to direct the rendering engine to generate an adjustment of the virtual reality scene in which the object of current focus of the user moves toward a point of view of the user within the virtual reality scene, wherein the adjustment of the virtual reality scene enlarges the object of current focus of the user within a field of view of the user within the virtual reality scene,
the computer system operable to direct transmission of the adjustment of the virtual reality scene to the head mounted display,
the computer system operable to receive and process a signal indicating activation of a transparency control and in response direct the rendering engine to generate a further adjustment of the virtual reality scene in which the object of current focus of the user is made transparent to reveal other selectable objects within the virtual reality scene behind the object of current focus of the user and to enable selection of the other selectable objects behind the object of current focus of the user visible in transparent form,
the computer system operable to direct transmission of the further adjustment of the virtual reality scene to the head mounted display.

18. The system as recited in claim 17, wherein the computer system is operable to direct transmission of audio content associated with the object of current focus of the user to the head mounted display.

19. The system as recited in claim 17, wherein the computer system is operable to determine the focus direction of the user within the virtual reality scene based on movement of the head mounted display, or
wherein the computer system is operable to determine the focus direction of the user within the virtual reality scene based on eye gaze direction of the user within the virtual reality scene, or
wherein the computer system is operable to determine the focus direction of the user within the virtual reality scene based on both movement of the head mounted display and eye gaze direction of the user within the virtual reality scene.

20. The system as recited in claim 17, wherein the computer system is operable to determine a plurality of objects of current focus of the user within the virtual reality scene based on the focus direction and one or more additional inputs received from the user, wherein the computer system is operable to direct the rendering engine to generate an adjustment of the virtual reality scene in which each of the plurality of objects of current focus of the user moves toward the point of view of the user within the virtual reality scene.

21. The system as recited in claim 20, wherein the computer system is operable to direct transmission of audio content associated with each of the plurality of objects of current focus of the user to the head mounted display.

22. The system as recited in claim 17, wherein the computer system is operable to determine a new focus direction of the user within the virtual reality scene, the computer system operable to determine a second object of current focus of the user within the virtual reality scene based on the new focus direction of the user being directed toward the second object of current focus of the user, wherein the second object of current focus of the user is one of the other selectable objects behind the object of current focus of the user visible in transparent form.

23. The system as recited in claim 22, wherein the computer system is operable to receive and process a signal indicating selection of the second object of current focus of the user and in response direct the rendering engine to generate a further adjustment of the virtual reality scene in which the second object of current focus of the user is moved toward the point of view of the user within the virtual reality scene.

24. The system as recited in claim 23, wherein the further adjustment of the virtual reality scene in which the second object of current focus of the user is moved toward the point of view of the user within the virtual reality scene includes enlargement of the second object of current focus of the user within the field of view of the user within the virtual reality scene.

25. The system as recited in claim 24, wherein the further adjustment of the virtual reality scene in which the second object of current focus of the user is moved toward the point of view of the user within the virtual reality scene includes removal of the object of current focus of the user visible in transparent form from the field of view of the user within the virtual reality scene.

* * * * *